United States Patent
Yamada

(10) Patent No.: US 9,002,707 B2
(45) Date of Patent: Apr. 7, 2015

(54) DETERMINING THE POSITION OF THE SOURCE OF AN UTTERANCE

(71) Applicant: Sony Corporation, Tokyo (JP)

(72) Inventor: Keiichi Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 231 days.

(21) Appl. No.: 13/669,843

(22) Filed: Nov. 6, 2012

(65) Prior Publication Data

US 2013/0124209 A1 May 16, 2013

(30) Foreign Application Priority Data

Nov. 11, 2011 (JP) ................................. 2011-247130

(51) Int. Cl.
*G10L 15/00* (2013.01)
*G10L 17/00* (2013.01)
*G06K 9/00* (2006.01)
*G06K 9/62* (2006.01)
*G10L 17/10* (2013.01)
*G10L 21/0272* (2013.01)
*G01S 3/802* (2006.01)

(52) U.S. Cl.
CPC .......... *G06K 9/00335* (2013.01); *G06K 9/0057* (2013.01); *G06K 9/00684* (2013.01); *G06K 9/624* (2013.01); *G10L 17/10* (2013.01); *G10L 21/0272* (2013.01); *G01S 3/802* (2013.01)

(58) Field of Classification Search
CPC ....................................................... G10L 15/17
USPC .................................. 704/231–257, 270–275
See application file for complete search history.

(56) References Cited

U.S. PATENT DOCUMENTS

| | | | | |
|---|---|---|---|---|
| 6,009,396 A | * | 12/1999 | Nagata | 704/270 |
| 8,311,233 B2 | * | 11/2012 | Kinghorn | 381/59 |
| 2002/0161577 A1 | * | 10/2002 | Smith | 704/233 |
| 2003/0033150 A1 | * | 2/2003 | Balan et al. | 704/275 |
| 2008/0120100 A1 | * | 5/2008 | Takeda et al. | 704/233 |

FOREIGN PATENT DOCUMENTS

| | | |
|---|---|---|
| JP | 2009-31951 | 2/2009 |
| JP | 2009-140366 | 6/2009 |

* cited by examiner

*Primary Examiner* — Jesse Pullias
(74) *Attorney, Agent, or Firm* — Sony Corporation

(57) ABSTRACT

An information processing apparatus includes: a plurality of information input units; an event detection unit that generates event information including estimated position information and estimated identification information of users present in the real space based on analysis of the information from the information input unit; and an information integration processing unit that inputs the event information, and generates target information including a position of each user and user identification information based on the input event information, and signal information representing a probability value of the event generation source, wherein the information integration processing unit includes an utterance source probability calculation unit, and wherein the utterance source probability calculation unit performs a process of calculating an utterance source score as an index value representing an utterance source probability of each target by multiplying weights based on utterance situations by a plurality of different information items from the event detection unit.

10 Claims, 18 Drawing Sheets

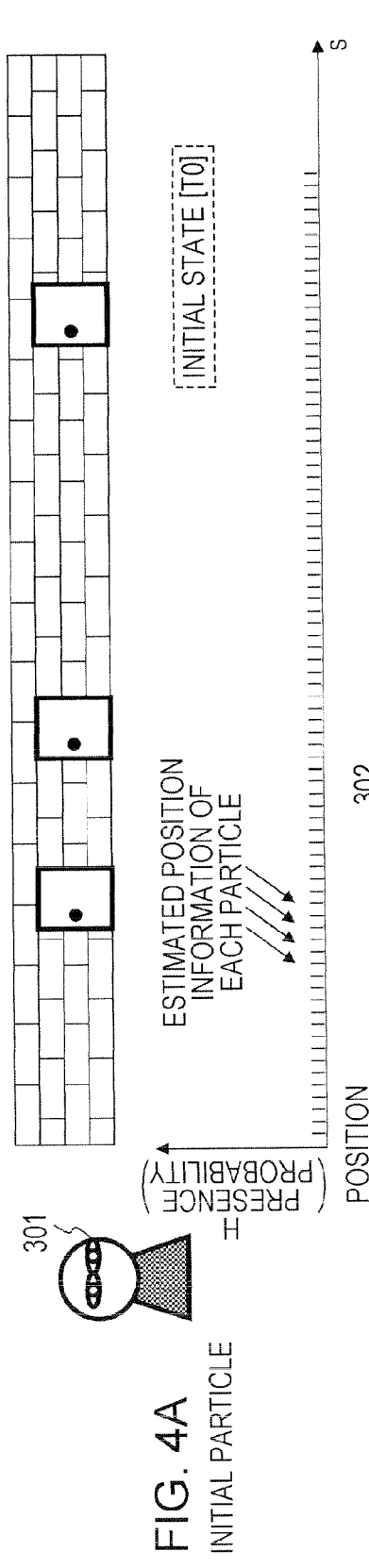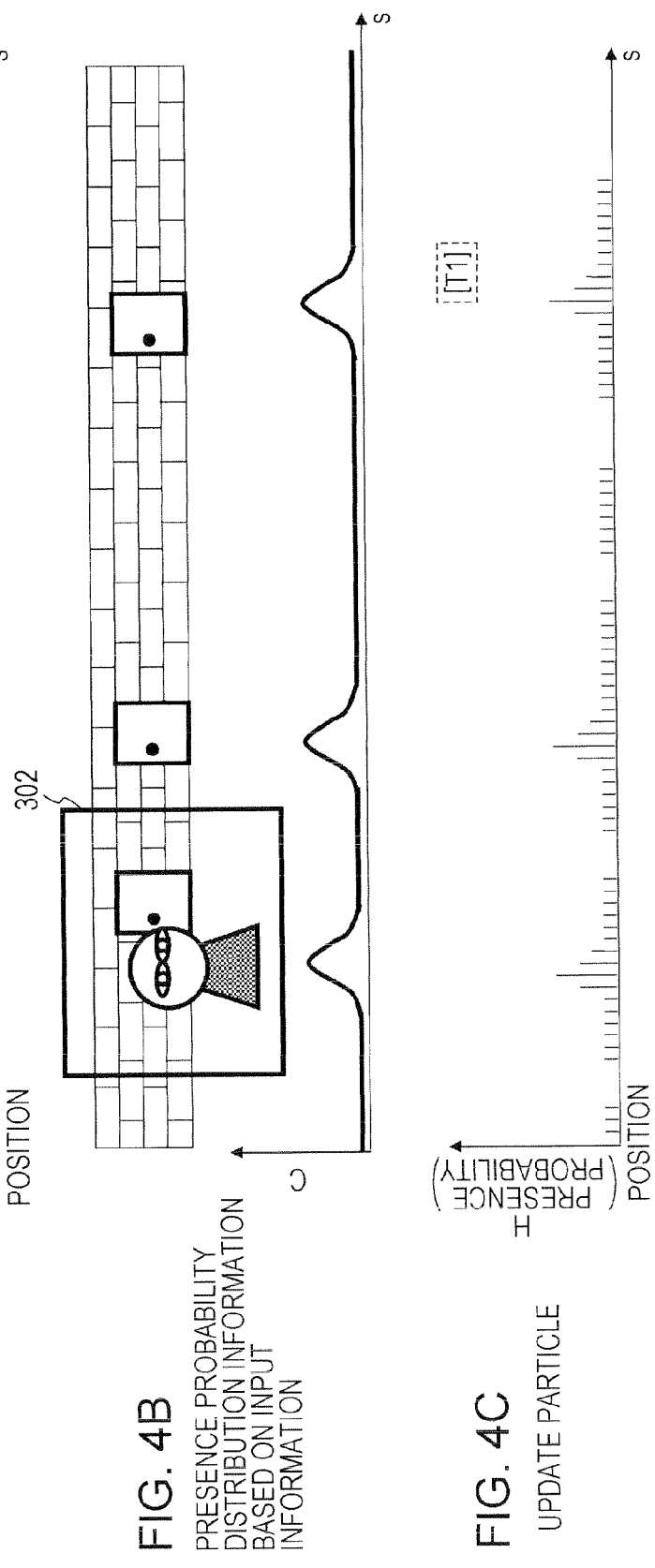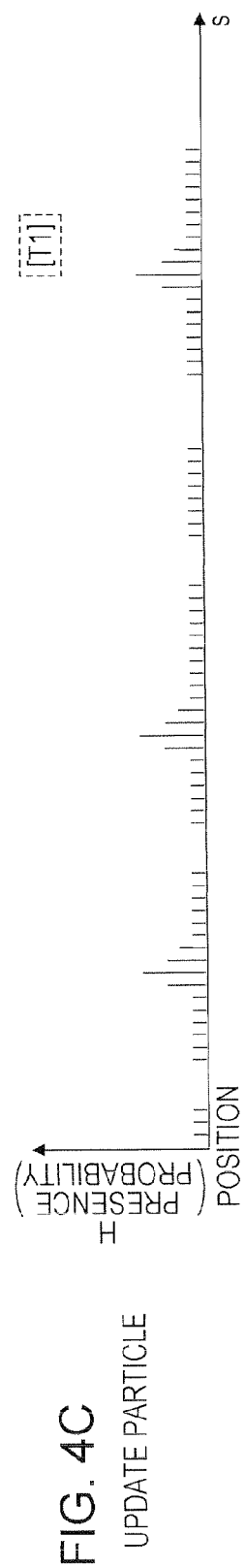

FIG. 14

CALCULATION EQUATION OF
VOICE EVENT UTTERANCE SOURCE SCORE $$P = D^{\alpha} \cdot S^{\beta} \cdot L^{\gamma}$$

$$\alpha + \beta + \gamma = 1$$

D: VOICE SOURCE DIRECTION INFORMATION
S: UTTERER IDENTIFICATION INFORMATION
L: LIP MOVEMENT INFORMATION
$\alpha$: WEIGHT COEFFICIENT OF SOUND
SOURCE INFORMATION
$\beta$: WEIGHT COEFFICIENT OF UTTERER
IDENTIFICATION INFORMATION
$\gamma$: WEIGHT COEFFICIENT OF LIP
MOVEMENT INFORMATION

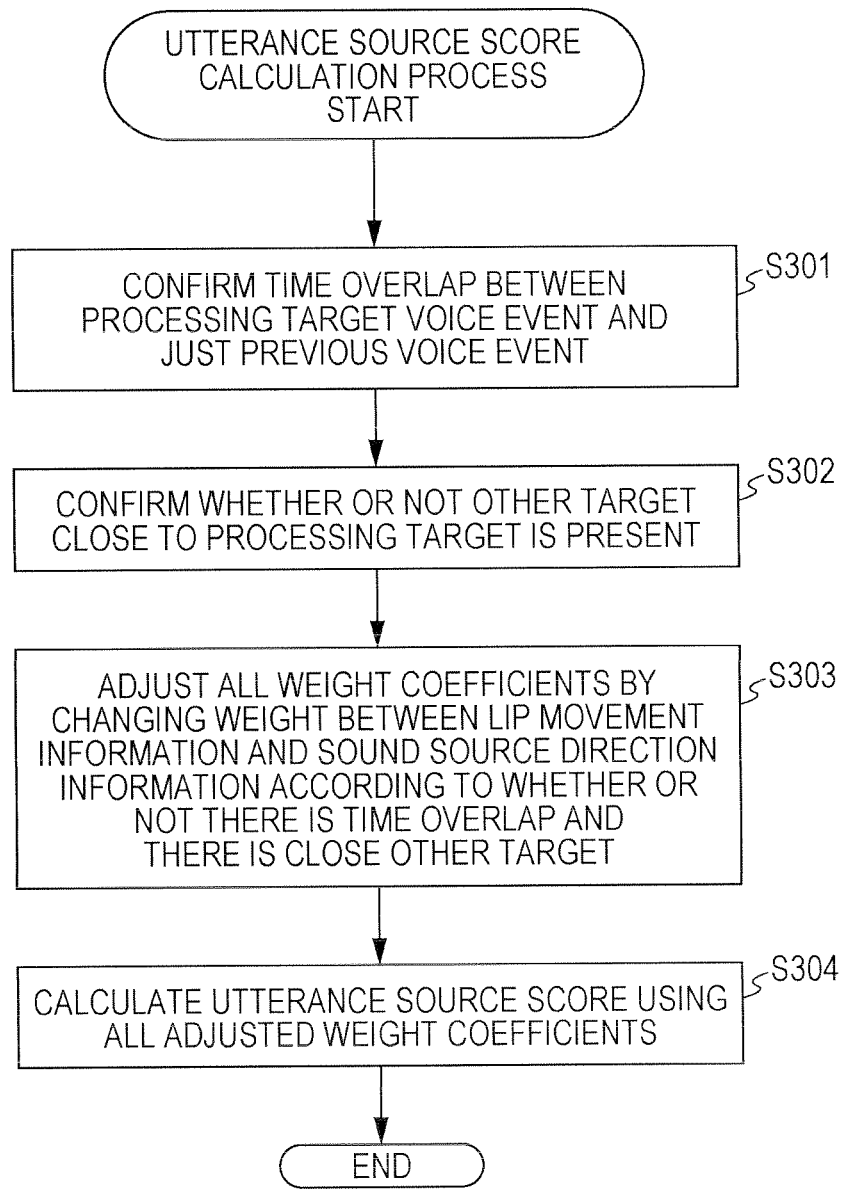

FIG. 16A

CASE WHERE POSITION BETWEEN TWO PERSONS IS FAR, AND ONE PERSON UTTERS WORDS

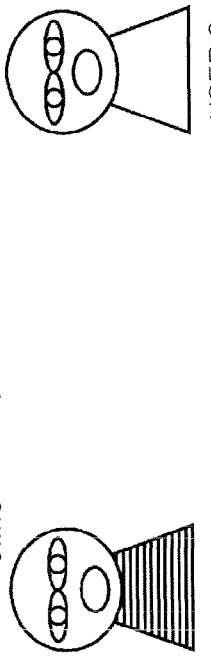

USER 1    USER 2

DIFFERENCE IN POSITION CORRESPONDING TO SOUND SOURCE DIRECTION 10°

FIG. 16B

CASE WHERE POSITION BETWEEN TWO PERSONS IS FAR, AND TWO PERSONS SIMULTANEOUSLY UTTER WORDS

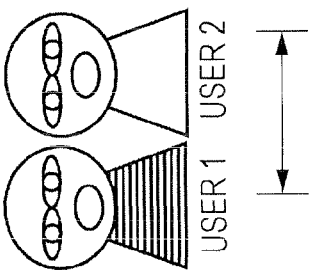

USER 1    USER 2

FIG. 16C

CASE WHERE POSITION BETWEEN TWO PERSONS IS CLOSE, AND ONE PERSON UTTERS WORDS

USER 1  USER 2

FIG. 16D

CASE WHERE POSITION BETWEEN TWO PERSONS IS CLOSE, AND TWO PERSONS SIMULTANEOUSLY UTTER WORDS

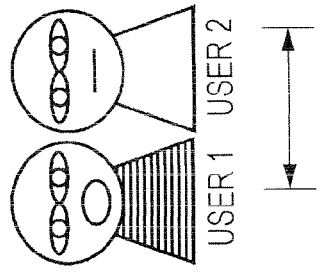

USER 1  USER 2

FIG. 17

| | WHEN ONLY ONE PERSON UTTERS WORDS ALONE | CASE OF SIMULTANEOUS UTTERANCE |
|---|---|---|
| CASE WHERE SOUND SOURCE DIRECTION IS FAR | USE PRESET VALUES OF ALL WEIGHT COEFFICIENTS | WEIGHT (γ) OF LIP MOVEMENT INFORMATION IS MADE SMALL |
| CASE WHERE SOUND SOURCE DIRECTION IS CLOSE | WEIGHT (α) OF SOUND SOURCE DIRECTION INFORMATION IS MADE SMALL | WEIGHT (γ) OF LIP MOVEMENT INFORMATION AND WEIGHT (α) OF SOUND SOURCE DIRECTION INFORMATION ARE MADE SMALL |

FIG. 18A

NUMERICAL VALUE EXAMPLE OF ALL WEIGHT COEFFICIENTS
(CASE WHERE ALL PRESET VALUES ARE SIMILAR (PRESET VALUE: $\alpha = \beta = \gamma$))

|  | WHEN ONLY ONE PERSON UTTERS WORDS ALONE ||| CASE OF SIMULTANEOUS UTTERANCE |||
|---|---|---|---|---|---|---|
|  | SOUND SOURCE DIRECTION | UTTERER IDENTIFICATION | LIP MOVEMENT | SOUND SOURCE DIRECTION | UTTERER IDENTIFICATION | LIP MOVEMENT |
| CASE WHERE SOUND SOURCE DIRECTION IS FAR | 0.333 | 0.333 | 0.333 | 0.417 | 0.417 | 0.167 |
| CASE WHERE SOUND SOURCE DIRECTION IS CLOSE | 0.167 | 0.417 | 0.417 | 0.167 | 0.667 | 0.167 |

FIG. 18B

NUMERICAL VALUE EXAMPLE OF ALL WEIGHT COEFFICIENTS
(PRESET VALUES ARE DIFFERENT (PRESET VALUE: $\alpha \ne \beta \ne \gamma$))

|  | WHEN ONLY ONE PERSON UTTERS WORDS ALONE ||| CASE OF SIMULTANEOUS UTTERANCE |||
|---|---|---|---|---|---|---|
|  | SOUND SOURCE DIRECTION | UTTERER IDENTIFICATION | LIP MOVEMENT | SOUND SOURCE DIRECTION | UTTERER IDENTIFICATION | LIP MOVEMENT |
| CASE WHERE SOUND SOURCE DIRECTION IS FAR | 0.500 | 0.200 | 0.300 | 0.607 | 0.243 | 0.150 |
| CASE WHERE SOUND SOURCE DIRECTION IS CLOSE | 0.250 | 0.300 | 0.450 | 0.250 | 0.600 | 0.150 |

DETERMINING THE POSITION OF THE SOURCE OF AN UTTERANCE

BACKGROUND

The present disclosure relates to an information processing apparatus, an information processing method, and a program, and more particularly, to an information processing apparatus, an information processing method, and a program which analyze an external environment based on input information by inputting input information from the outside world, for example, information such as images, voices and the like, and specifically, analyzes the position of a person who is speaking and the like.

The present disclosure relates to an information processing apparatus, an information processing method, and a program which identify a user who is speaking and analyze each utterance when a plurality of persons are speaking simultaneously.

A system that performs an interactive process between a person and information processing apparatuses such as a PC or a robot, for example, a communication process or an interactive process is referred to as a man-machine interaction system. In a man-machine interaction system, the information processing apparatus such as a PC, a robot, or the like performs analysis based on input information by inputting image information or voice information to recognize human actions such as human behavior or words.

When a person transmits information, in addition to words, various channels for gestures, line of sight, facial expressions, and the like are used as information transmission channels. If it is possible to analyze all of these channels in a machine, even communication between people and machines may reach the same level as that of communication between people. An interface capable of analyzing input information from these multiple channels (also referred to as modality or modal) is called a multi-modal interface, and development and research into such an interface have been conducted extensively in recent years.

For example, when performing analysis by inputting image information captured by a camera and sound information obtained by a microphone, in order to perform more specific analysis, inputting a large amount of information from a plurality of cameras and a plurality of microphones which are positioned at various points is effective.

As a specific system, for example, the following system is assumed. An information processing apparatus (a television) receives or is input images and voices of users (father, mother, sister, and brother) in front of the television via a camera and a microphone, and analyzes the position of each of the users, which user is speaking, and the like, so that a system capable of performing processes according to analysis information such as the camera zooming-in with respect to a user who has spoken, making an adequate response with respect to the user who has spoken, or the like may be realized.

Examples of the related art in which an existing man-machine interaction system is disclosed include, for example, Japanese Unexamined Patent Application Publication No. 2009-31951 and Japanese Unexamined Patent Application Publication No. 2009-140366. In the related art, a process in which information from a multi-channel (modal) is integrated in a probabilistic manner, and the position of each of a plurality of users, who are the plurality of users, and who is issuing signals, that is, who is speaking are determined with respect to each of the plurality of users is performed.

For example, when determining who is issuing the signals, virtual targets (tID=1 to m) corresponding to the plurality of users are set, and a probability that each of the targets is an utterance source is calculated from analysis results of image data captured by a camera or sound information obtained by a microphone.

Specifically, for example, the following amounts are calculated, (a) sound source direction information of a voice event obtainable via the microphone, user position information obtainable from utterer identification (ID) information, and an utterance source probability P(tID) of a target tID obtainable from only the user identification information, and (b) an area $S_{Af}(tID)$ of a face attribute score [S(tID)] obtainable by a face recognition process based on images obtainable via a camera, wherein (a) and (b) are calculated to thereby calculate an utterer probability Ps(tID) or Pp(tID) of each (tID=1 to m) of the targets by addition or multiplication based on a weight $\alpha$ using $\alpha$ as a preset allocation weight coefficient.

In addition, the details of this process are described in, for example, Japanese Unexamined Patent Application Publication No. 2009-140366.

In the calculation process of the utterer probability in the above described related art, it is necessary that the weight coefficient $\alpha$ is adjusted beforehand as described above. Adjusting the weight coefficient beforehand is cumbersome, and when the weight coefficient is not adjusted to a suitable numerical value, there is a problem in that the validity of the calculation result of the utterer probability is greatly affected.

SUMMARY

It is desirable to provide an information processing apparatus, an information processing method, and a program, which may perform a process for integrating information estimated to be more accurate by performing a stochastic process with respect to uncertain information included in various input information such as image information, sound information, and the like in a system for performing analysis of input information from a plurality of channels (modality or modal), more specifically, specific processes such as, for example, the position of persons in the surrounding area, or the like, so that robustness may be improved, and highly accurate analysis may be performed.

In addition, it is desirable to provide an information processing apparatus, an information processing method, and a program, which identify a user who is speaking and analyze each utterance when a plurality of persons are speaking simultaneously.

According to a first embodiment of the present disclosure, there is provided an information processing apparatus including: a plurality of information input units that input observation information of a real space; an event detection unit that generates event information including estimated position information and estimated identification information of users present in the real space based on analysis of the information input from the information input units; and an information integration processing unit that inputs the event information, and generates target information including a position of each user and user identification information on the basis of the input event information, and signal information representing a probability value of the event generation source, wherein the information integration processing unit includes an utterance source probability calculation unit, and wherein the utterance source probability calculation unit performs a process of calculating an utterance source score as an index value representing an utterance source probability of each target by multiplying weights based on utterance situations by a plurality of different information items input from the event detection unit.

In the information processing apparatus, the utterance source probability calculation unit may receive an input of (a) user position information (sound source direction information), and (b) user identification information (utterer identification information) which are corresponding to an utterance event as input information from a voice event detection unit constituting the event detection unit, may receive an input of (a) user position information (face position information), (b) user identification information (face identification information), and (c) lip movement information as the target information generated based on input information from an image event detection unit constituting the event detection unit, and may perform a process of calculating the utterance source score based on the input information by adopting at least one item of the above-mentioned information.

In the information processing apparatus, the utterance source probability calculation unit may apply sound source direction information D, utterer identification information S, and lip movement information L, and perform a process of calculating the utterance source score according to the following utterance source score calculation equation P: $P = D^\alpha \cdot S^\beta \cdot L^\gamma$, where $\alpha$ is a weight coefficient of sound source direction information, $\beta$ is a weight coefficient of utterer identification information, $\gamma$ is a weight coefficient of lip movement information, and $\alpha + \beta + \gamma = 1$.

In the information processing apparatus, the utterance source probability calculation unit may perform a process of adjusting the weight coefficients $\alpha$, $\beta$, and $\gamma$ according to an utterance situation.

In the information processing apparatus, the utterance source probability calculation unit may perform a process of adjusting the weight coefficients $\alpha$, $\beta$, and $\gamma$ according to the following two conditions of (Condition 1) whether it is a single utterance from only one target or a simultaneous utterance from two targets and (Condition 2) whether positions of the two targets are close to each other or positions of the two targets are far apart.

In the information processing apparatus, the utterance source probability calculation unit may perform a process of adjusting the weight coefficients $\alpha$, $\beta$, and $\gamma$ such that the weight coefficient $\gamma$ of the lip movement information is small in a situation where two targets with an utterance probability are present and the two targets speak simultaneously.

In the information processing apparatus, the utterance source probability calculation unit may perform a process of adjusting the weight coefficients $\alpha$, $\beta$, and $\gamma$ such that the weight coefficient $\alpha$ of the sound source direction information is small in a situation where two targets with an utterance probability are present and positions of the two targets are close to each other and only one target speaks.

In the information processing apparatus, the utterance source probability calculation unit may perform a process of adjusting the weight coefficients $\alpha$, $\beta$, and $\gamma$ such that the weight coefficient $\gamma$ of the lip movement information and the weight coefficient $\alpha$ of the sound source direction information are small in a situation where two targets with an utterance probability are present and positions of the two targets are close to each other and two targets speak simultaneously.

According to a second embodiment of the present disclosure, there is provided an information processing method of performing an information analysis process in an information processing apparatus, the method including: receiving, by a plurality of information input units, an input of observation information of a real space; generating, by an event detection unit, event information including estimated position information and estimated identification information of users present in the real space based on analysis of the information input from the information input units; and receiving, by an information integration processing unit, an input of an event, and generating target information including a position of each user and user identification information on the basis of the input event information, and signal information representing a probability value of the event generation source, wherein in the generating of the target information, a process of calculating an utterance source score as an index value representing an utterance source probability of each target by multiplying weights based on utterance situations by a plurality of different information items input in the generating of the event information is performed.

According to a third embodiment of the present disclosure, there is provided a program for causing an information processing apparatus to execute an information analysis of: receiving, by a plurality of information input units, an input of observation information of a real space; generating, by an event detection unit, event information including estimated position information and estimated identification information of users present in the real space based on analysis of the information input from the information input unit; and inputting, by an information integration processing unit, receiving an input of an event, and generating target information including a position of each user and user identification information on the basis of the input event information, and signal information representing a probability value of the event generation source, wherein in the generating of the target information, a process of calculating an utterance source score as an index value representing an utterance source probability of each target by multiplying weights based on utterance situations by a plurality of different information items input in the generating of the event information is performed.

The program of the present disclosure is a program which can be provided in a storage medium or a communication medium in a computer-readable format, for example, in an information processing apparatus or a computer system capable of executing various program codes. By providing such a program in a computer-readable format, a process corresponding to the program is realized in the information processing apparatus or the computer system.

Other objects, characteristics, and advantages of the present disclosure may be clarified through detailed description based on the accompanying drawings. A system in the specification is a logical group configuration of a plurality of apparatuses, and the present disclosure is not limited to the apparatuses with each configuration being provided in the same case.

According to a configuration of an embodiment of the present disclosure, a configuration that generates a user position, identification information, utterer information, and the like by information analysis based on uncertain and asynchronous input information is realized.

Specifically, the information processing apparatus may include an information integration processing unit that receives an input of event information including estimated position and estimated identification data of a user based on image information or voice information, and generates target information including a position and user identification information of each user based on the input event information and signal information representing a probability value for an event generating source. The information integration processing unit includes an utterance source probability calculation unit, the utterance source probability calculation unit performs a process of calculating an utterance source score as an index value representing an utterance source probability of each target by multiplying weights based on utterance situations by a plurality of different information items input from an event detection unit.

According to such a process, for example, even in a situation where two targets (two persons) are speaking simultaneously, it is possible to estimate who are speaking with high precision.

BRIEF DESCRIPTION OF THE DRAWINGS

FIG. 4A to FIG. 4C are diagrams illustrating a basic processing example to which a particle filter is applied.

FIG. 14 is a diagram illustrating a process of calculating an utterance source score performed by an utterance source probability calculation unit.

FIG. 15 is a flowchart illustrating a calculation processing sequence of an utterance source score performed by an utterance source probability calculation unit.

FIG. 16A to FIG. 16D are diagrams illustrating an example of an utterance situation that is a determination element of a weight coefficient in a process of calculating an utterance source score performed by an utterance source probability calculation unit.

FIG. 17 is a diagram illustrating an example of a process of determining a weight coefficient in a process of calculating an utterance source score performed by an utterance source probability calculation unit.

FIG. 18A and FIG. 18B are diagrams illustrating an example of a process of determining a weight coefficient in a process of calculating an utterance source score performed by an utterance source probability calculation unit.

DETAILED DESCRIPTION OF EMBODIMENTS

Figure 1:
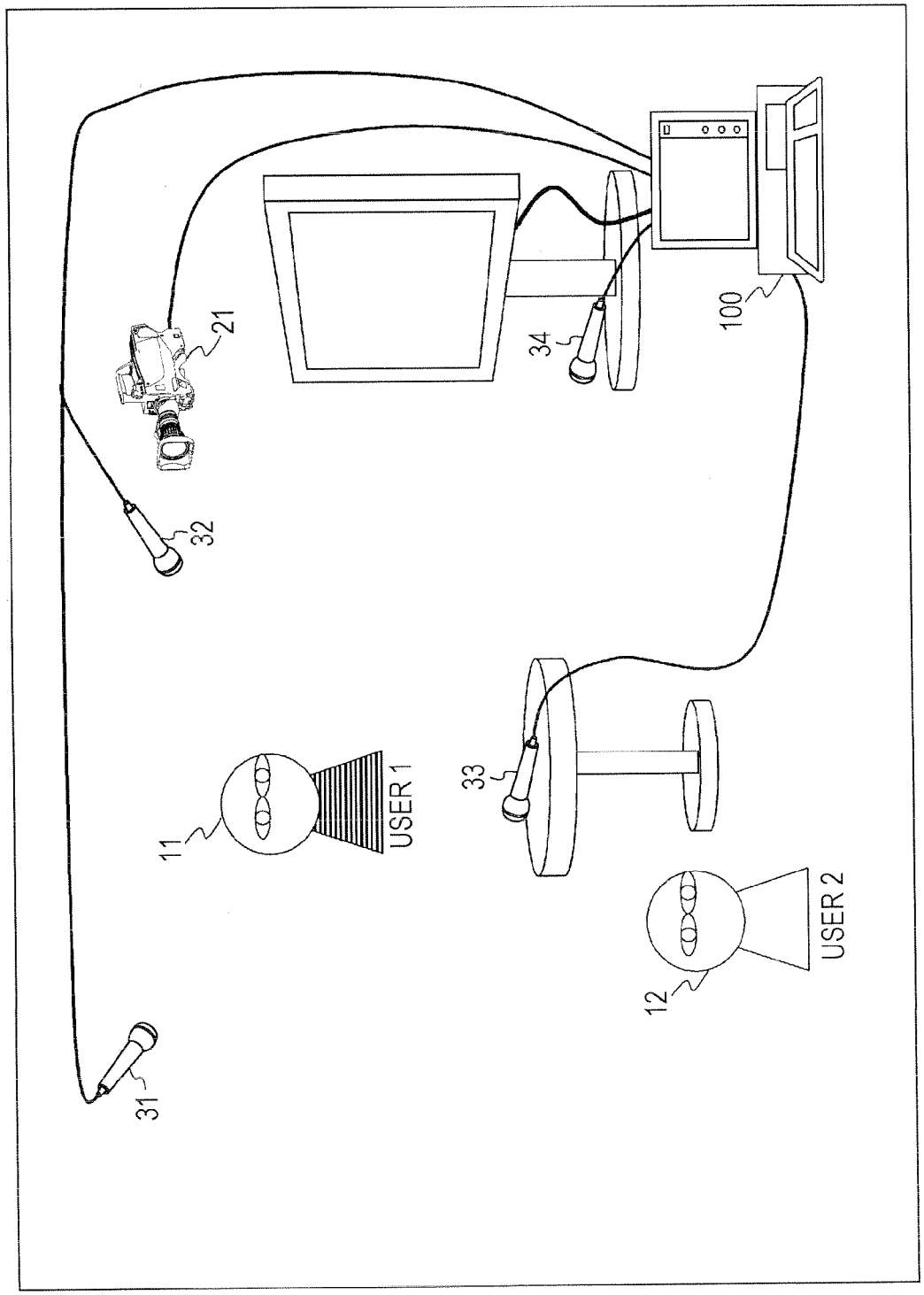
FIG. 1 is a diagram illustrating an overview of a process performed by an information processing apparatus according to an embodiment of the present disclosure.

Hereinafter, an information processing apparatus, an information processing method, and a program according to exemplary embodiments of the present disclosure will be described in detail with reference to the accompanying drawings. The description will be made according to the following items:

1. Overview of a process performed by an information processing apparatus of the present disclosure
2. Details of a configuration and a process of an information processing apparatus of the present disclosure
3. Processing sequence performed by an information processing apparatus of the present disclosure
4. Details of a process performed by an utterance source probability calculation unit
5. Process of calculating utterance source score
6. Summary of configurations of the present disclosure

[1. Overview of a Process Performed by an Information Processing Apparatus of the Present Disclosure]

First, an overview of a process performed by an information processing apparatus of the present disclosure will be described.

The present disclosure realizes a configuration in which an identifier is used with respect to voice event information corresponding to an utterance of a user from within input event information when calculating an utterance source probability, so that it is not necessary for a weight coefficient described in BACKGROUND to be adjusted beforehand.

Specifically, an identifier for identifying whether each target is an utterance source, or an identifier for determining which one of two items of target information seems more likely to be an utterance source with respect to only two items of target information is used. As the input information to the identifier, sound source direction information or utterer identification information included in voice event information, lip movement information included in image event information from within event information, and a target position or a total number of targets included in target information are used. By using the identifier when calculating the utterance source probability, it is not necessary that the weight coefficient described in BACKGROUND is adjusted beforehand, thereby it is possible to calculate a more appropriate utterance source probability.

First, an overview of a process performed by an information processing apparatus according to the present disclosure will be described with reference to FIG. 1. The information processing apparatus 100 of the present disclosure inputs image information and voice information from a sensor in which observation information in real time is input, here for example, a camera 21 and a plurality of microphones 31 to 34, and performs analysis of the environment based on the input information. Specifically, position analysis of a plurality of users 1, 11 to 2, 12, and identification of the users of the corresponding positions are performed.

In an example shown in drawing, for example, in a case where users 1, 11 to 2, 12 are a brother and sister in a family, the information processing apparatus 100 performs analysis of the image information and the voice information input from the camera 21 and the plurality of microphones 31 to 34 to thereby identify the positions of the two users 1 and 2, and whether the user in each position is the sister or the brother. The identified result is used for various processes. For example, the identified result is used for a process such as a camera zooming-in of on a user who has spoken, a television making a response with respect to the user having a conversation, or the like.

In addition, as a main process of the information processing apparatus 100 according to the present disclosure, a user position identification and a user specification process are performed as a user identification process based on input information from a plurality of information input units (camera 21, and microphones 31 to 34). Applications of the identified result are not particularly limited. Various uncertain information is included in the image information and the voice information input from the camera 21 and the plurality of microphones 31 to 34. In the information processing apparatus 100 according to the present disclosure, a stochastic process is performed with respect to the uncertain information included in the input information, and the information being subjected to the stochastic process is integrated to information estimated to be highly accurate. By this estimation process, robustness is improved to perform analysis with high accuracy.

[2. Details of a Configuration and a Process of an Information Processing Apparatus of the Present Disclosure]

Figure 2:
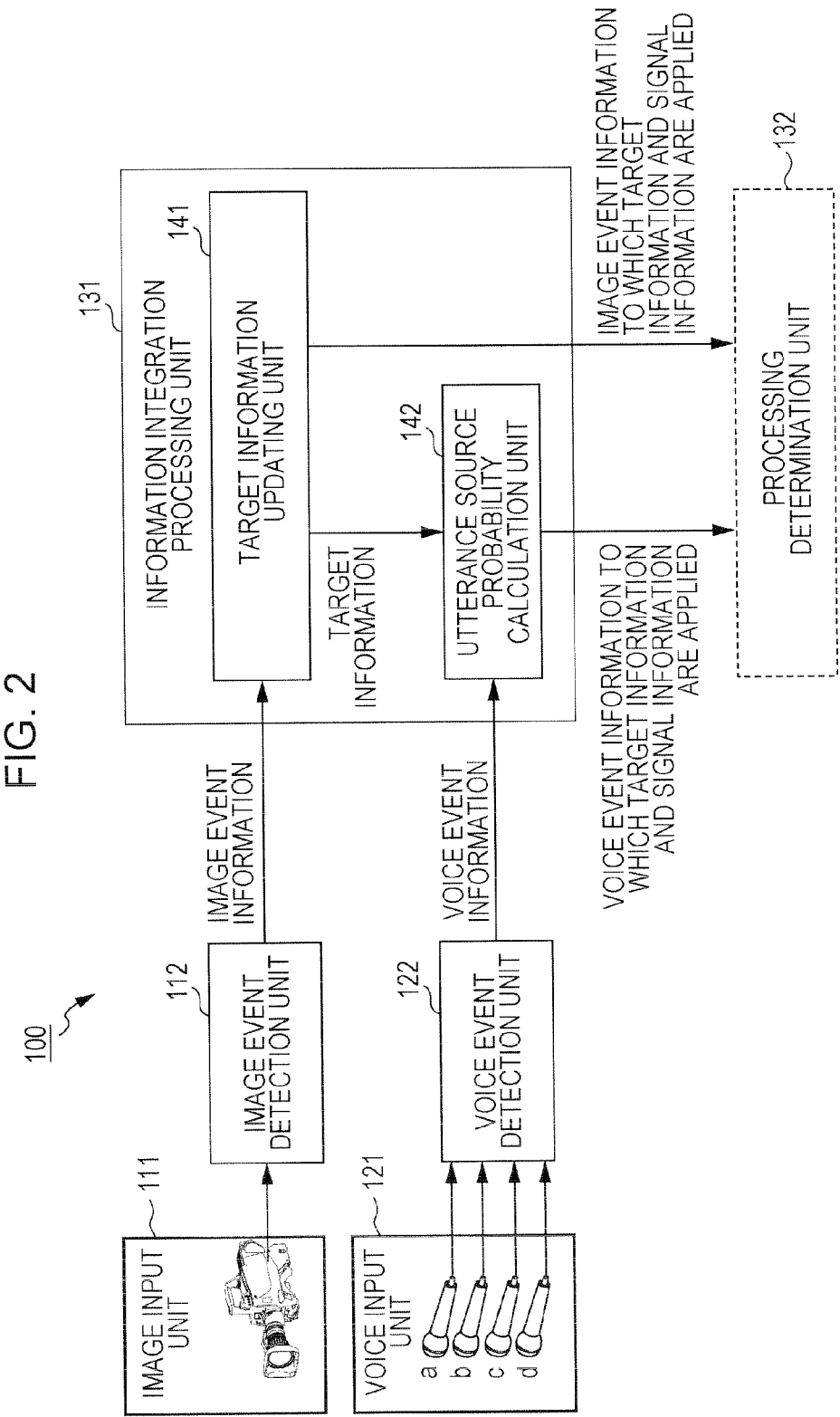
FIG. 2 is a diagram illustrating a configuration and a process of an information processing apparatus according to an embodiment of the present disclosure.

In FIG. 2, a configuration example of the information processing apparatus 100 is illustrated. The information processing apparatus 100 includes an image input unit (camera) 111 and a plurality of voice input units (microphones) 121a to 121d as an input device. The information processing apparatus 100 inputs image information from the image input unit (camera) 111, and inputs voice information from the voice input unit (microphones) 121 to thereby perform analysis based on this input information. Each of the plurality of voice input units (microphones) 121a to 121d is disposed in various positions as shown in FIG. 1.

The voice information input from the plurality of microphones 121a to 121d is input to an information integration processing unit 131 via a voice event detection unit 122. The voice event detection unit 122 analyzes and integrates voice information input from the plurality of voice input units (microphones) 121a to 121d disposed in a plurality of different positions. Specifically, a position in which sound is generated and user identification information indicating which user generates the sound are generated based on the voice information input from the voice input units (microphones) 121a to 121d, and inputs the generated information to the information integration processing unit 131.

In addition, as a specific process performed by the information processing apparatus 100, identifying a position of each user A and B and which one of users A and B has spoken in an environment where a plurality of users are present as shown in FIG. 1, that is, performance of a user position and a user identification. Specifically, the specific process is a process for specifying an event generation source such as a person (utterer) who is speaking, or the like.

The voice event detection unit 122 analyzes the voice information input from the plurality of voice input units (microphones) 121a to 121d disposed in a plurality of different positions, and generates position information of a voice generation source as probability distribution data. Specifically, the voice event detection unit 122 generates an expected value and distribution data $N(m_e, \sigma_e)$ with respect to a sound source direction. In addition, the voice event detection unit 122 generates user identification information based on a comparison with feature information of a voice of a user that is registered in advance. The identification information is also generated as a probabilistic estimated value. Since feature information of the voices of a plurality of users to be verified in advance is registered in the voice event detection unit 122, a comparison between an input voice and registered voices is performed, and a process of determining which user's voice has a high probability of corresponding to the input voice is performed, such that a posterior probability or a score with respect to all of the registered users is calculated.

In this manner, the voice event detection unit 122 analyzes the voice information input from the plurality of voice input units (microphones) 121a to 121d disposed in the plurality of different positions, generates "integrated voice event information" configured by probability distribution data as position information of a generation source of the voice, and user identification information constituted by a probabilistic estimated value, and inputs the generated integrated voice event information to the information integration processing unit 131.

Meanwhile, the image information input from the image input unit (camera) 111 is input to the information integration processing unit 131 via the image event detection unit 112. The image event detection unit 112 analyzes the image information input from the image input unit (camera) 111, extracts a face of a person included in the image, and generates position information of the face as probability distribution data. Specifically, an expected value for a position or a orientation of the face, and distribution data $N(m_e, \sigma_e)$ are generated.

In addition, the image event detection unit 112 identifies a face by performing a comparison with feature information of a user's face that is registered in advance, and generates user identification information. The identification information is generated as a probabilistic estimated value. Since feature information with respect to the faces of a plurality of users to be verified in advance is registered in the image event detection unit 112, a comparison between feature information of an image of a face area extracted from an input image and feature information of a registered face image is performed, a process of determining which user's face corresponds to the high probability input image is determined, so that a posterior probability or a score with respect to all of the registered users is calculated.

In addition, the image event detection unit 112 calculates an attribute score corresponding to a face included in the image input from the image input unit (camera) 111, for example, a face attribute score generated based on a movement of a mouth area.

It is possible to set so as to calculate the following various face attribute scores:

(a) a score corresponding to the movement of the mouth area of the face included in the image, (b) a score set depending on whether the face included in the image is a smiling face or not, (c) a score set depending on whether the face included in the image is a male face or a female face, and (d) a score set depending on whether the face included in the image is an adult face or a face of a child.

In the embodiment described below, an example in which (a) a score corresponding to a movement of a mouth area of the face included in the image is calculated and used as the face attribute score is described. That is, the score corresponding to the movement of the mouth area of the face is calculated as the face attribute score, and specification of an utterer is performed based on the face attribute score.

The image event detection unit 112 identifies the mouth area from the face area included in the image input from the image input unit (camera) 111, and detects a movement of the mouth area, so that a score with a higher value is calculated in a case where it is determined that a score corresponding to a movement detection result is detected, for example, when a movement of the mouth area is detected.

In addition, a movement detection process of the mouth area is performed as a process to which VSD (Visual Speech Detection) is applied. A method disclosed in Japanese Unexamined Patent Application Publication No. 2005-157679 relating to the application of the same applicant as that of the present disclosure is applied. Specifically, for example, left and right corners of the lips are detected from a face image detected from the image input from the image input unit (camera) 111, a difference in luminance is calculated after the left and right corners of the lips are aligned in an N-th frame and an (N+1)-th frame, and a value of the difference is processed as a threshold value, thereby detecting a movement of the lips.

In addition, techniques of the related art may be applied to the voice identification process performed in the voice event detection unit 122 or the image event detection unit 112, a face detection process, or a face identification process. For example, Sabe Kotaro, Hidai Kenichi, "Learning for real-time arbitrary posture face detectors using pixel difference characteristics", the 10$^{th}$ image sensing symposium proceedings, pp. 547 to 552, 2004, and Japanese Unexamined Patent Application Publication No. 2004-302644 (P2004-302644A) [Title: Face identification apparatus, Face identification method, Recording medium, and Robot apparatus] disclose applications of the face detection process and the face identification process.

The information integration processing unit 131 performs a process of probabilistically estimating who each of a plurality of users is, a position of each of the plurality of users, and who is generating signals such as a voice or the like, based on the input information from the voice event detection unit 122 or the image event detection unit 112.

Specifically, the information integration processing unit 131 outputs, to a processing determination unit 132, each item of information such as (a) "target information" as estimation information concerning the position of each of the plurality of users, and who they are, and (b) "signal information" such as an event generation source of, for example, a user, or the like who is speaking based on the input information from the voice event detection unit 122 or the image event detection unit 112.

In addition, the following two items of signal information are included in the signal information: (b1) signal information based on a voice event and (b2) signal information based on an image event.

A target information updating unit 141 of the information integration processing unit 131 performs target updating using, for example, a particle filter by inputting the image event information detected in the image event detection unit 112, and generates the target information and the signal information based on the image event to thereby output the generated information to the processing determination unit 132. In addition, the target information obtained as the updating result is also output to the utterance source probability calculation unit 142.

The utterance source probability calculation unit 142 of the information integration processing unit 131 calculates a probability in which each of the targets is a generation source of the input voice event using an identification model (identifier) by inputting the voice event information detected in the voice event detection unit 122. The utterance source probability calculation unit 142 generates signal information based on the voice event based on the calculated value, and outputs the generated information to the processing determination unit 132.

This process will be described later in detail.

The processing determination unit 132 receiving the identification processing result including the target information and the signal information generated by the information integration processing unit 131 performs a process using the identification processing result. For example, processes such as a camera zooming-in with respect to, for example, a user who has spoken, or a television making a response with respect to the user who has spoken, or the like are performed.

As described above, the voice event detection unit 122 generates probability distribution data of position information of the generation source of a voice, and more specifically, an expected value and distribution data N($m_e$, $\sigma_e$) with respect to a sound source direction. In addition, the voice event detection unit 122 generates user identification information based on a comparison result such as feature information of a user that is registered in advance, and inputs the generated information to the information integration processing unit 131.

In addition, the image event detection unit 112 extracts a face of a person included in the image, and generates position information of the face as probability distribution data. Specifically, the image event detection unit 112 generates an expected value and dispersion data N($m_e$, $\sigma_e$) with respect to a position and a orientation of the face. In addition, the image event detection unit 112 generates user identification information based on a comparison process performed with the feature information of the face of the user that is registered in advance, and inputs the generated information to the information integration processing unit 131. In addition, the image event detection unit 112 detects a face attribute score as face attribute information from a face area within the image input from the image input unit (camera) 111, for example, a movement of a mouth area, calculates a score corresponding to the movement detection result of the mouth area, and more specifically, a face attribute score with a high value when a significant movement of the mouth area is detected, and inputs the calculated score to the information integration processing unit 131.

Figure 3A:
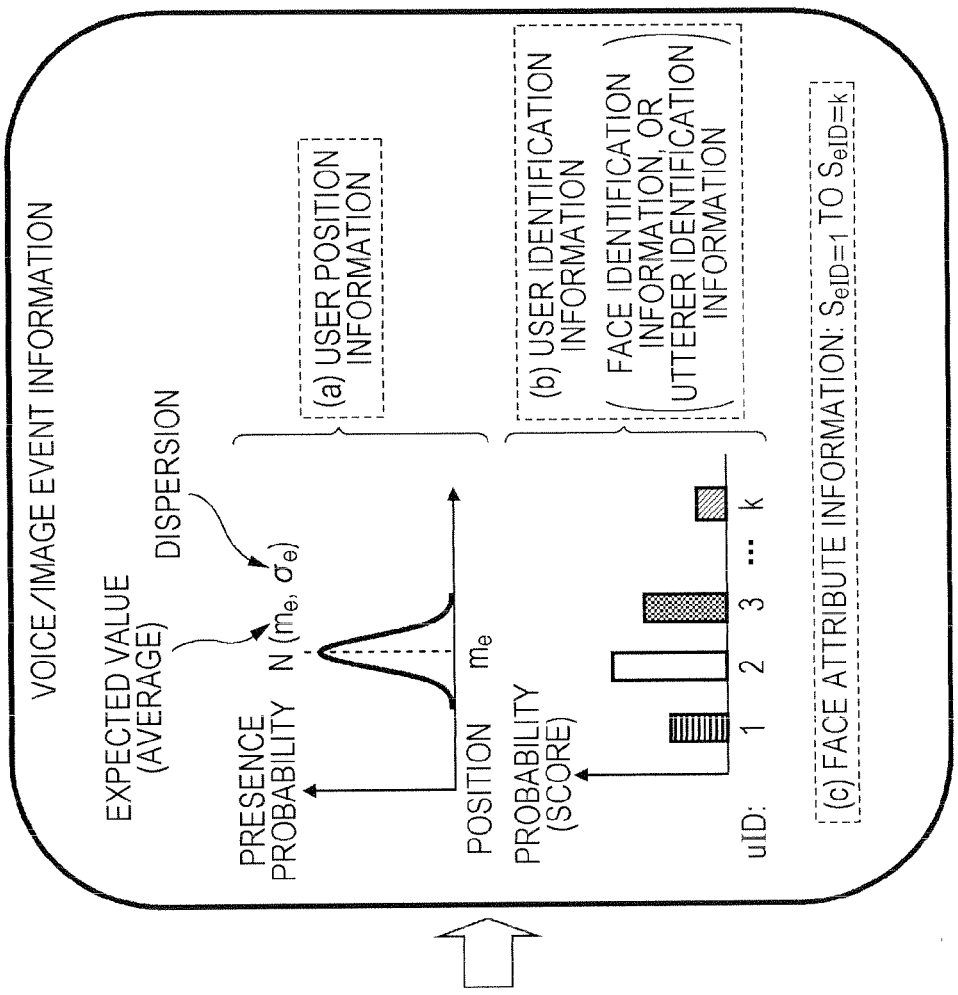
FIG. 3A and FIG. 3B are diagrams illustrating an example of information that is generated by a voice event detection unit and an image event detection unit, and is input to an information integration processing unit.
Figure 3B:
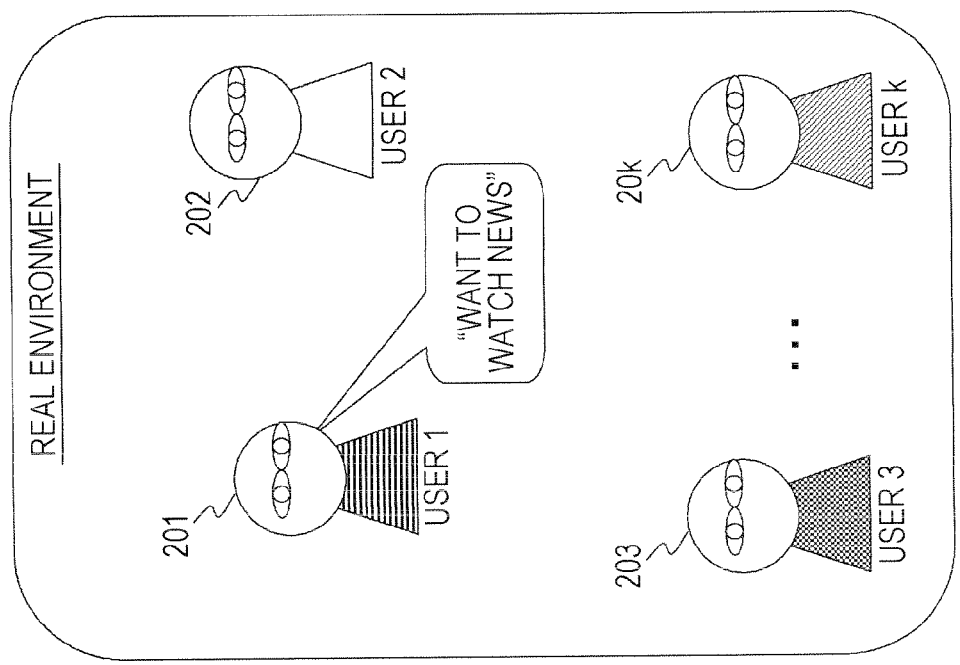

Referring to FIG. 3A and FIG. 3B, examples of information that is generated by the voice event detection unit 122 and the image event detection unit 112, and input to the information integration processing unit 131 are described.

In the configuration of the present disclosure, the image event detection unit 112 generates data such as (Va) an expected value and dispersion data N($m_e$, $\sigma_e$) with respect to a position and a orientation of a face, (Vb) user identification information based on feature information of a face image, and (Vc) a score corresponding to attributes of a detected face, for example, a face attribute score generated based on a movement of a mouth area, and inputs the generated data to the information integration processing unit 131.

In addition, the voice event detection unit 122 inputs, to the information integration processing unit 131, data such as (Aa) an expected value and dispersion data N($m_e$, $\sigma_e$) with respect to a sound source direction, and (Ab) user identification information based on voice characteristics.

An example of a real environment including the same camera and the microphone as those described with reference to FIG. 1 is illustrated in FIG. 3A, and there are a plurality of users 1 to k, 201 to 20k. In this environment, when any one of the users is speaking, the voice is input via the microphone. In addition, the camera continuously photographs images.

The information that is generated by the voice event detection unit 122 and the image event detection unit 112, and is input to the information integration processing unit 131 is classified into three types such as (a) user position information, (b) user identification information (face identification information or utterer identification information), and (c) face attribute information (face attribute score).

That is, (a) user position information is integrated information of (Va) an expected value and dispersion data N ($m_e$, $\sigma_e$) with respect to a face position or direction, which is generated by the image event detection unit 112, and (Aa) an expected value and dispersion data ($m_e$, $\sigma_e$) with respect to a sound source direction, which is generated by the voice event detection unit 122.

In addition, (b) user identification information (face identification information or utterer identification information) is integrated information of (Vb) user identification information based on feature information of a face image, which is generated by the image event detection unit 112, and (Ab) user identification information based on feature information of voice, which is generated by the voice event detection unit 122.

The (c) face attribute information (face attribute score) is corresponding to a score corresponding to the detected face attribute (Vc) generated by the image event detection unit 112, for example, a face attribute score generated based on the movement of the lip area.

Three kinds of information such as the (a) user position information, the (b) user identification information (face identification information or utterer identification information), and the (c) face attribute information (face attribute score) are generated for each event.

When voice information is input from the voice input units (microphones) 121a to 121d, the voice event detection unit 122 generates the above described (a) user information and (b) user identification information based on the voice information, and inputs the generated information to the information integration processing unit 131. The image event detection unit 112 generates the (a) user position information, the (b) user identification information, and the (c) face attribute information (face attribute score) based on the image information input from the image input unit (camera) 111 at a certain frame interval determined in advance, and inputs the generated information to the information integration processing unit 131. In addition, in this embodiment, the image input unit (camera) 111 shows an example in which a single camera is set, and images of a plurality of users are photographed by the single camera. In this case, the (a) user position information and the (b) user identification information are generated with respect to each of the plurality of faces included in a single image, and the generated information is input to the information integration processing unit 131.

A process in which the voice event detection unit 122 generates the (a) user position information and the (b) user identification information (utterer identification information) will be described based on the voice information input from the voice input unit (microphone) 121a to 121d.

[Process of Generating (a) User Position Information by the Voice Event Detection Unit 122]

The voice event detection unit 122 generates estimated information of a position of a user who generated a voice that is analyzed based on the voice information input from the voice input unit (microphone) 121a to 121d, that is, a position of an utterer. That is, the voice event detection unit 122 generates a position estimated to be where the utterer is, as Gaussian distribution (normal distribution) data $N(m_e, \sigma_e)$ obtained from an expected value (average) $[m_e]$ and distribution information $[\sigma_e]$.

[Process of Generating (b) User Identification Information (Utterer Identification Information) by the Voice Event Detection Unit 122]

The voice event detection unit 122 estimates who the utterer is based on the voice information input from the voice input unit (microphone) 121a to 121d, by a comparison between feature information of the input voice and feature information of the voices of users 1 to k registered in advance. Specifically, a probability that the utterer is each of the users 1 to k is calculated. The calculated value (b) is used as the user identification information (utterer identification information). For example, the highest score is distributed to a user having registered voice characteristics closest to the characteristics of the input voice, and the lowest score (for example, zero) is distributed to a user having the most different characteristics from the characteristics of the input voice, so that data setting a probability that the input voice belongs to each of the users is generated, and the generated data is used as the (b) user identification information (utterer identification information).

Next, a process in which the image event detection unit 112 generates information such as (a) user position information, (b) user identification information (face identification information), and (c) face attribute information (face attribute score) based on the image information input from the image input unit (camera) 111 will be described.

[Process of Generating (a) User Position Information by Image Event Detection Unit 112]

The image event detection unit 112 generates estimated information of a face position with respect to each of faces included in the image information input from the image input unit (camera) 111. That is, a position at which it is estimated that the face detected from the image is present is generated as Gaussian distribution (normal distribution) data $N(m_e, \sigma_e)$ obtained from an expected value (average) $[m_e]$ and distribution information $[\sigma_e]$.

[Process of Generating (b) User Identification Information (Face Identification Information) by the Image Event Detection Unit 112]

The image event detection unit 112 detects a face included in image information based on the image information input from the image input unit (camera) 111, and estimates who each of the faces is by a comparison between the input image information and feature information of a face of each user 1 to k registered in advance. Specifically, a probability that each extracted face is each of the users 1 to k is calculated. The calculated value is used as (b) user identification information (face identification information). For example, the highest score is distributed to a user having characteristics of a registered face closest to characteristics of a face included in the input image, and the lowest score (for example, zero) is distributed to a user having the most different characteristics from the characteristics of the face, so that data setting a probability that the input voice belongs to each user is generated, and the generated data is used as (b) user identification information (face identification information).

[Process of Generating (c) Face Attribute Information (Face Attribute Score) by the Image Event Detection Unit 112]

The image event detection unit 112 detects a face area included in the image information based on image information input from the image input unit (camera) 111, and calculates attributes of the detected face, specifically, attribute scores such as the above described movement of the mouth area of the face, whether the detected face is a smiling face, whether the detected face is a male face or a female face, whether the detected face is an adult face, and the like. However, in this processing example, an example in which a score corresponding to the movement of the mouth area of the face included in the image is calculated and used as the face attribute score will be described.

As the process of calculating the score corresponding to the movement of the lip area of the face, the image event detection unit 112 detects left and right corners of a lips from the face image detected from the image input from the image input unit (camera) 111, a difference in luminance is calculated after the left and right corners of the lips are aligned in an N-th frame and an (N+1)-th frame, and a value of the difference is processed as a threshold value. By this process, the movement of the lips is detected, a face attribute score in which a higher score is obtained with an increase in the movement of the lips is set.

In addition, when a plurality of faces is detected from an image photographed by the camera, the image event detection unit 112 generates event information corresponding to each of the faces as a separate event according to each of the detected faces. That is, the image event detection unit 112 generates event information including the following information and inputs them to the information integration processing unit 131. The image event detection unit 112 generates the information such as (a) user position information, (b) user identification information (face identification information), and (c) face attribute information (face attribute score), and inputs the generated information to the information integration processing unit 131.

In this embodiment, an example in which a single camera is used as the image input unit 111 was described, however, images photographed by a plurality of cameras may be used. In such a case, the image event detection unit 112 generates (a) user position information, (b) user identification information (face identification information), and (c) face attribute information (face attribute score) with respect to each of the faces included in each of the photographed images of the plurality of cameras, and inputs the generated information to the information integration processing unit 131.

Next, a process performed by the information integration processing unit 131 will be described. The information integration processing unit 131 inputs the three items of information shown in FIG. 3B from the voice event detection unit 122 and the image event detection unit 112 as described above, that is, (a) user position information, (b) user identification information (face identification information or utterer identification information), and (c) face attribute information (face attribute score) in this stated order. In addition, a variety of settings are possible with respect to an input timing of each of the above items of information, however, for example, the voice event detection unit 122 generates and inputs each item of information of the above (a) and (b) as the voice event information when a new voice is input, so that the image event detection unit 112 generates and inputs each item of information of (a), (b), and (c) as voice event information in a certain frame period unit.

A process performed by the information integration processing unit 131 will be described with reference to FIG. 4A to FIG. 4C.

As described above, the information integration processing unit 131 includes a target information updating unit 141 and an utterance source probability calculation unit 142, and performs the following processes.

The target information updating unit 141 inputs the image event information detected in the image event detection unit 112, for example, performs a target updating process using a particle filter, and generates target information and signal information based on the image event to thereby output the generated information to the processing determination unit 132. In addition, the target information as the updating result is output to the utterance source probability calculation unit 142.

The utterance source probability calculation unit 142 inputs the voice event information detected in the voice event detection unit 122, and calculates a probability in which each target is an utterance source of the input voice event using an identification model (identifier). The utterance source probability calculation unit 142 generates, based on the calculated value, signal information based on the voice event, and outputs the generated information to the processing determination unit 132.

First, a process performed by the target information updating unit 141 will be described.

The target information updating unit 141 of the information integration processing unit 131 performs a process of leaving only more probable hypothesis by setting probability distribution data of a hypothesis with respect to a position and identification information of a user, and updating the hypothesis based on the input information. As this processing scheme, a process to which a particle filter is applied is performed.

The process to which the particle filter is applied is performed by setting a large number of particles corresponding to various hypotheses. In this embodiment, a large number of particles corresponding to hypotheses concerning a position of the user and who the user is are set, and a process of increasing a more probable weight of the particles based on the three items of information shown in FIG. 3B from the image event detection unit 112, that is, (a) user position information, (b) user identification information (face identification information or utterer identification information), and (c) face attribute information (face attribute score) is performed.

A basic processing example to which the particle filter is applied will be described with reference to FIG. 4A to FIG. 4C. For example, the example shown in FIG. 4A to FIG. 4C shows a processing example of estimating a presence position corresponding to a user by the particle filter. In the example shown in FIG. 4A to FIG. 4C, a process of estimating a position where a user 301 is in a one-dimensional area on any straight line is performed.

An initial hypothesis (H) becomes uniform particle distribution data as shown in FIG. 4A. Next, image data 302 is acquired, and probability distribution data of presence of a user 301 based on the acquired image is acquired as data of FIG. 4B. Based on the probability distribution data based on the acquired image, particle distribution data of FIG. 4A is updated, thereby obtaining updated hypothesis probability distribution data of FIG. 4C. This process is repeatedly performed based on the input information, thereby obtaining more probable position information than that of the user.

In addition, details of the process using the particle filter are described in, for example, [D. Schulz, D. Fox, and J. Hightower. People Tracking with Anonymous and ID-sensors Using Rao-Blackwellised Particle Filters. Proc. of the International Joint Conference on Artificial Intelligence (IJCAI-03)].

In the processing example shown in FIG. 4A to FIG. 4C, input information is processed only with respect to a presence position of the user using the image data only. Here, each of the particles has information concerning the presence position of the user 301 only.

The target information updating unit 141 of the information integration processing unit 131 acquires the information shown in FIG. 3B from the image event detection unit 112, that is, (a) user position information, (b) user identification information (face identification information or utterer identification information), and (c) face attribute information (face attribute score), and determines positions of a plurality of users and who each of the plurality of users is. Accordingly, in the process to which the particle filter is applied, the information integration processing unit 131 sets a large number of particles corresponding to a hypothesis concerning a position of the user and who the user is, so that particle updating is performed based on the two items of information shown in FIG. 3B in the image event detection unit 112.

A particle updating processing example performed by inputting by the information integration processing unit 131, three items of information shown in FIG. 3B, that is, (a) user position information, (b) user identification information (face identification information or utterer identification information), and (c) face attribute information (face attribute score) from the voice event detection unit 122 and the image event detection unit 112 will be described with reference to FIG. 5.

In addition, the particle updating process which will be described below will be described as a processing example performed only using image event information in the target information updating unit 141 of the information integration processing unit 131.

A configuration of the particles will be described. The target information updating unit 141 of the information integration processing unit 131 has a predetermined number=m of particles. The particle shown in FIG. 5 is 1 to m. In each of the particles, a particle ID (pID=1 to m) is set as an identifier.

In each of the particles, a plurality of targets tID=1, 2, ... n corresponding to a virtual object is set. In this embodiment, a plurality (n-numbered) of targets corresponding to virtual users greater than the number of people estimated to be present in a real space are set as each of the particles. Each of m number of particles maintains data by the number of the targets in a target unit. In an example shown in FIG. 5, n-number (n=2) of targets are included in a single particle.

The target information updating unit 141 of the information integration processing unit 131 inputs the event information shown in FIG. 3B from the image event detection unit 112, that is, (a) user position information, (b) user identification information (face identification information or utterer identification information), and (c) face attribute information (face attribute score $[S_{eID}]$), and performs updating of m-number of particles (pID=1 to m).

Figure 5:
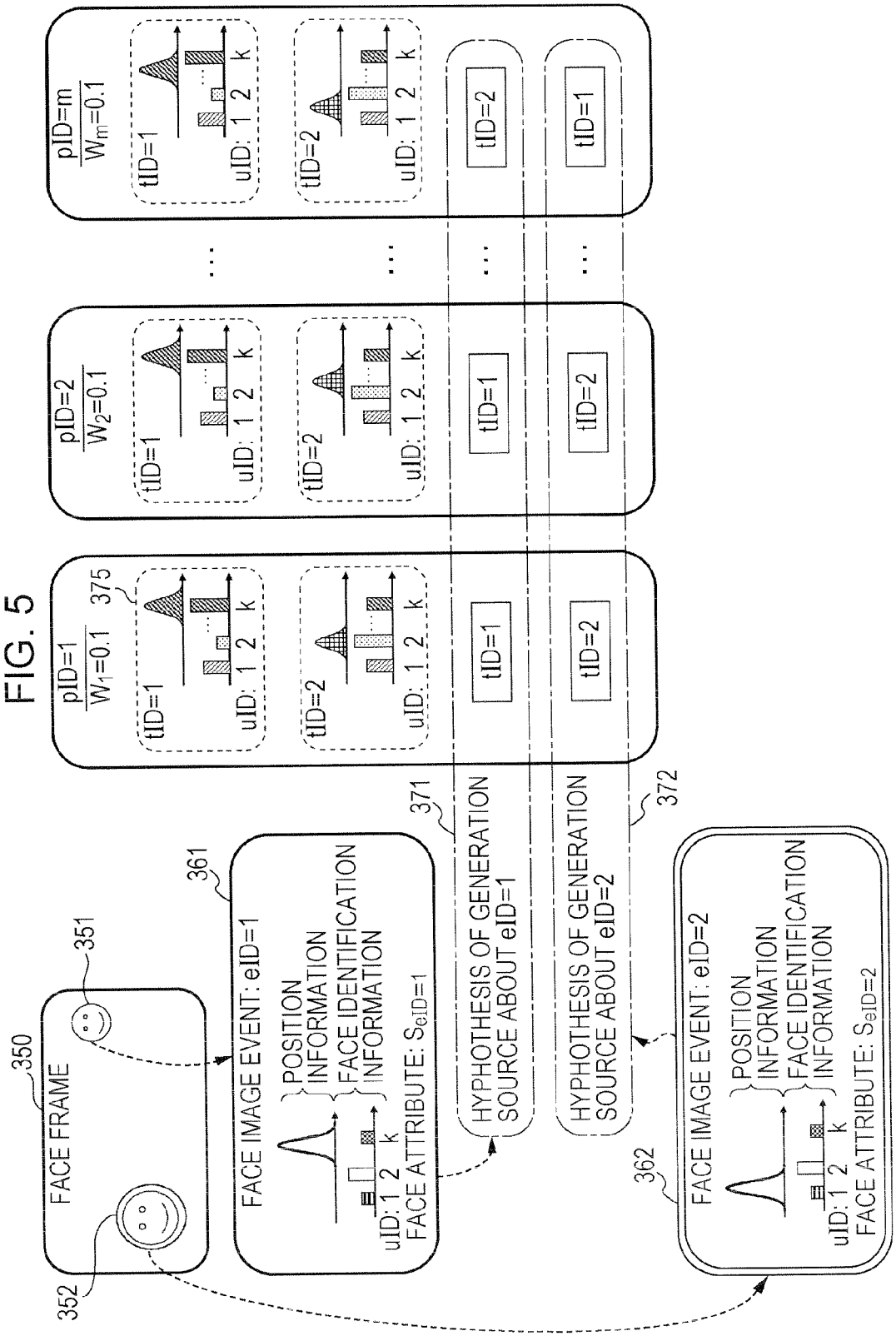
FIG. 5 is a diagram illustrating a configuration of particles set in the present processing example.

Each of targets 1 to n included in each of the particles 1 to m that is set by the information integration processing unit 131 shown in FIG. 5 is able to be associated with each of the input event information items (eID=1 to k) in advance, and updating of a selected target corresponding to the input event according to the association is performed. Specifically, for example, the face image detected in the image event detection unit 112 is subjected to the updating process as a separate event by associating a target with each of the face image events.

A specific updating process will be described. For example, the image event detection unit 112 generates (a) user position information, (b) user identification information, and (c) face attribute information (face attribute score) based on the image information input from the image input unit (camera) 111 at a certain frame interval determined in advance, and inputs the generated information to the information integration processing unit 131.

In this instance, when an image frame 350 shown in FIG. 5 is a frame of an event which is to be detected, an event corresponding to the number of face images included in the image frame. That is, an event 1 (eID=1) corresponding to a first face image 351 shown in FIG. 5, and an event 2 (eID=2) corresponding to a second face image 352 are detected.

The image event detection unit 112 generates (a) user position information, (b) user identification information (face identification information or utterer identification information), and (c) face attribute information (face attribute score) with respect to each of the events (eID=1, 2, ... ), and inputs the generated information to the information integration processing unit 131. That is, the generated information is information 361 and 362 corresponding to the events shown in FIG. 5.

Each of the targets 1 to n included in each of the particles 1 to m set in the target information updating unit 141 of the information integration processing unit 131 is able to be associated with each event (eID=1 to k), and has a configuration in which updating which target included in each of the particles is set in advance. In addition, the association of the target (tID) corresponding to each of the events (eID=1 to k) is set not to be overlapped. That is, event generation source hypothesis is generated by an acquired event so that the overlap does not occur in each of the particles.

In an example shown in FIG. 5, (1) particle 1 (pID=1) is a corresponding target of [event ID=1(eID=1)]=[target ID=1(tID=1)], and a corresponding target of [event ID=2(eID=2)]=[target ID=2(tID=2)], (2) particle 2 (pID=2) is a corresponding target of [event ID=1(eID=1)]=[target ID=1(tID=1)], and a corresponding target of [event ID=2(eID=2)]=[target ID=2(tID=2)],

...

(m) particle m (pID=m) is a corresponding target of [event ID=1(eID=1)]=[target ID=2(tID=2)], and a corresponding target of [event ID=2(eID=2)]=[target ID=1(tID=1)].

In this manner, each of the targets 1 to n included in each of the particles 1 to m set in the target information updating unit 141 of the information integration processing unit 131 is able to be associated in advance with each of the events (eID=1 to k), and has a configuration in which updating which target included in each of the particles according to each event ID is determined. For example, by event corresponding information 361 of [event ID=1(eID=1)] shown in FIG. 5, only data of target ID=1(tID=1) is selectively updated in a particle 1 (pID=1).

Similarly, by event corresponding information 361 of [event ID=1(eID=1)] shown in FIG. 5, only data of target ID=1(tID=1) is selectively updated even in a particle 2 (pID=2). In addition, by event corresponding information 361 of [event ID=1(eID=1)] shown in FIG. 5, only data of target ID=2(tID=2) is selectively updated in a particle m (pID=m).

Event generation source hypothesis data 371 and 372 shown in FIG. 5 is event generation source hypothesis data set in each of the particles, and an updating target corresponding to the event ID is determined depending on information concerning that the event generation source hypothesis data is set in each of the particles.

Figure 6:
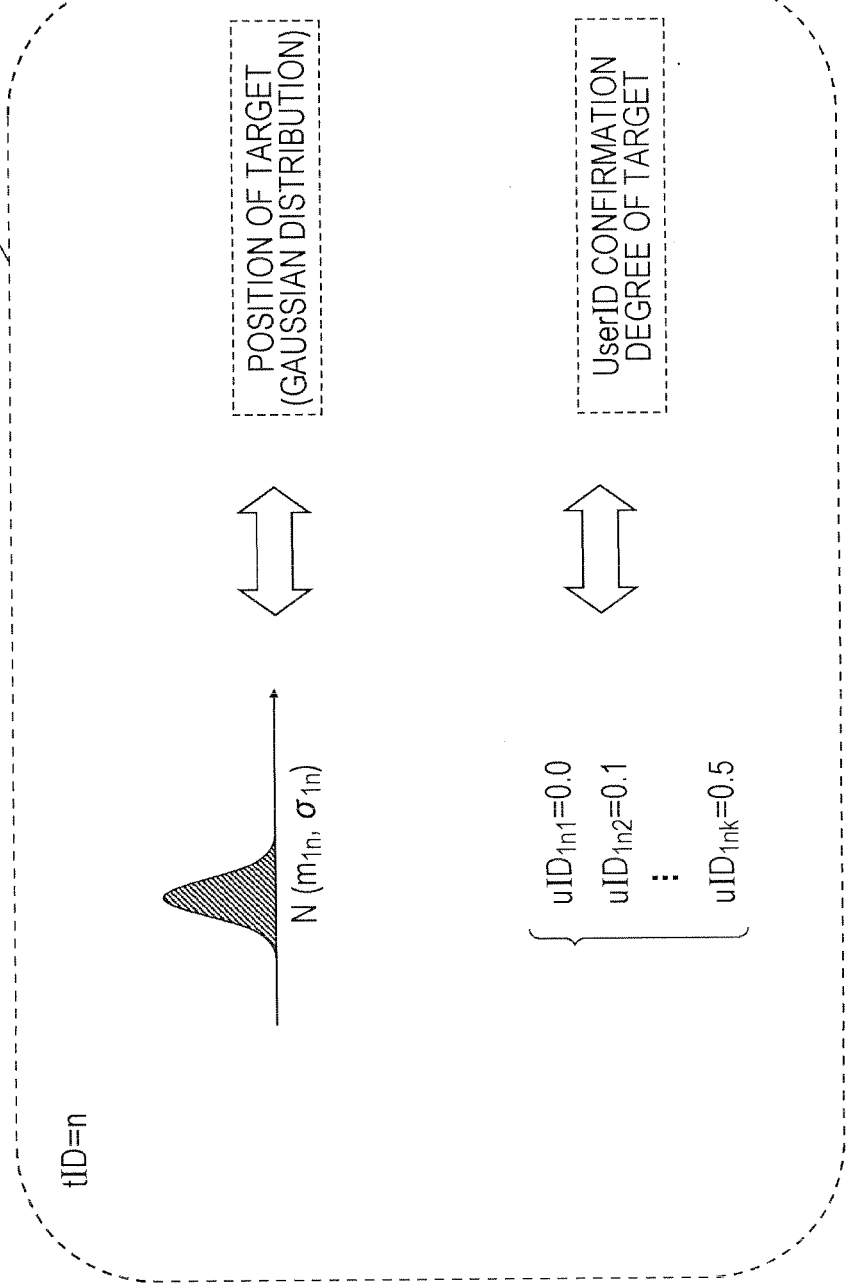
FIG. 6 is a diagram illustrating a configuration of target data of each target included in respective particles.

Each packet of target data included in each of the particles will be described with reference to FIG. 6. In FIG. 6, a configuration of target data of a single target 375 (target ID: tID=n) included in the particle 1 (pID=1) shown in FIG. 5 is shown. As shown in FIG. 6, the target data of the target 375 is configured by the following data, that is, (a) probability distribution of a presence position corresponding to each of the targets [Gaussian distribution: N $(m_{1n}, \sigma_{1n})$] and (b) user confirmation degree information (uID) indicating who each of the targets is $$uID_{1n1} = 0.0$$

$$uID_{1n2} = 0.1$$

...

$$uID_{1nk} = 0.5.$$

In addition, $(1_n)$ of $[m_{1n}, \sigma_{1n}]$ in the Gaussian distribution: N $(m_{1n}, \sigma_{1n})$ shown in the above (a) signifies Gaussian distribution as presence probability distribution corresponding to target ID: tID=n in particle ID: pID=1.

In addition, (1n1) included in $[uID_{1n1}]$ of the user confirmation degree information (uID) shown in the above (b) signifies a probability in which a user of target ID: tID=n in particle ID: pID=1 is user 1. That is, data of target ID=n signifies that a probability of being user 1 is 0.0, a probability of being user 2 is 0.1, . . . , and a probability of being user k is 0.5.

Referring again to FIG. 5, descriptions of the particles set in the target information updating unit 141 of the information integration processing unit 131 will be continuously made. As shown in FIG. 5, the target information updating unit 141 of the information integration processing unit 131 sets particles (pID=1 to m) of the predetermined number=m, and each of the particles has target data such as (a) probability distribution [Gaussian distribution: N(m, σ)] of a presence position corresponding to each of the targets, and (b) user confirmation degree information (uID) indicating who each of the targets is, with respect to each target (tID=1 to n) estimated to be present in a real space.

The target information updating unit 141 of the information integration processing unit 131 inputs event information (eID=1, 2 . . . ) shown in FIG. 3B, from the voice event detection unit 122 and the image event detection unit 112, that is, (a) user position information, (b) user identification information (face identification information or utterer identification information), and (c) face attribute information (face attribute score [$S_{eID}$]), and performs updating of a target corresponding to an event set in advance in each of the particles.

In addition, a target to be updated is data included in each packet of target data, that is, (a) user position information, and (b) user identification information (face identification information or utterer identification information).

The (c) face attribute information (face attribute score [$S_{eID}$]) is finally used as signal information indicating an event generation source. When a certain number of events is input, the weight of each particle is also updated, so that a weight of a particle having data closest to information in a real space is increased, and a weight of a particle having data unsuitable for the information in the real space is reduced. In this manner, when deviation occurs and converges in the weights of the particles, the signal information based on the face attribute information (face attribute score), that is, the signal information indicating the event generation source is calculated.

A probability in which any specific target x(tID=x) is a generation source of any event (eID=y) is represented as $P_{eID=x}$(tID=y). For example, as shown in FIG. 5, when m-number of particles (pID=1 to m) are set, and two targets (tID=1, 2) are set in each of the particles, a probability in which a first target (tID=1) is a generation source of a first event (eID=1) is $P_{eID=1}$(tID=1), and a probability in which a second target (tID=2) is a generation source of the first event (eID=1) is $P_{eID=1}$(tID=2).

In addition, a probability in which the first target (tID=1) is a generation source of a second event (eID=2) is $P_{eID=2}$(tID=1), and a probability in which the second target (tID=2) is the generation source of the second event (eID=2) is $P_{eID=2}$(tID=2).

The signal information indicating the event generation source is a probability $P_{eID=x}$(tID=y) in which a generation source of any event (eID=y) is a specific target x(tID=x), and this is corresponding to a ratio of the number of particles: m, which is set in the target information updating unit 141 of the information integration processing unit 131, and the number of targets allocated to each event. Here, in an example shown in FIG. 5, the following correspondence relationship is obtained:

$P_{eID=1}$(tID=1)=[the number of particles allocating tID=1 to a first event (eID=1)/(m)], $P_{eID=1}$(tID=2)=[the number of particles allocating tID=2 to a first event (eID=1)/(m)], $P_{eID=2}$(tID=1)=[the number of particles allocating tID=1 to second event (eID=2)/(m)], and $P_{eID=2}$(tID=2)=[the number of particles allocating tID=2 to second event (eID=2)/(m)].

This data is finally used as the signal information indicating the event generation source.

In addition, a probability in which a generation source of any event (eID=y) is a specific target x(tID=x) is $P_{eID=x}$(tID=y). This data is also applied to calculation of the face attribute information included in the target information. That is, this data is used in calculating the face attribute information $S_{tID=1 \ to \ n}$. Face attribute information $S_{tID=x}$ is corresponding to an expected value of a final face attribute of a target ID=x, that is, a value indicating a probability of being an utterer.

The target information updating unit 141 of the information integration processing unit 131 inputs event information (eID=1, 2 . . . ) from the image event detection unit 112, and performs updating of a target corresponding to an event set in advance in each of the particles. Next, the target information updating unit 141 generates (a) target information including position estimated information indicating a position of each of a plurality of users, estimated information (uID estimated information) indicating who each of the plurality of users is, and an expected value of face attribute information ($S_{tID}$), for example, a face attribute expected value indicating speaking with a moving mouth, and (b) signal information (image event correspondence signal information) indicating an event generation source such as a user who is speaking, and outputs the generated information to the processing determination unit 132.

Figure 7:
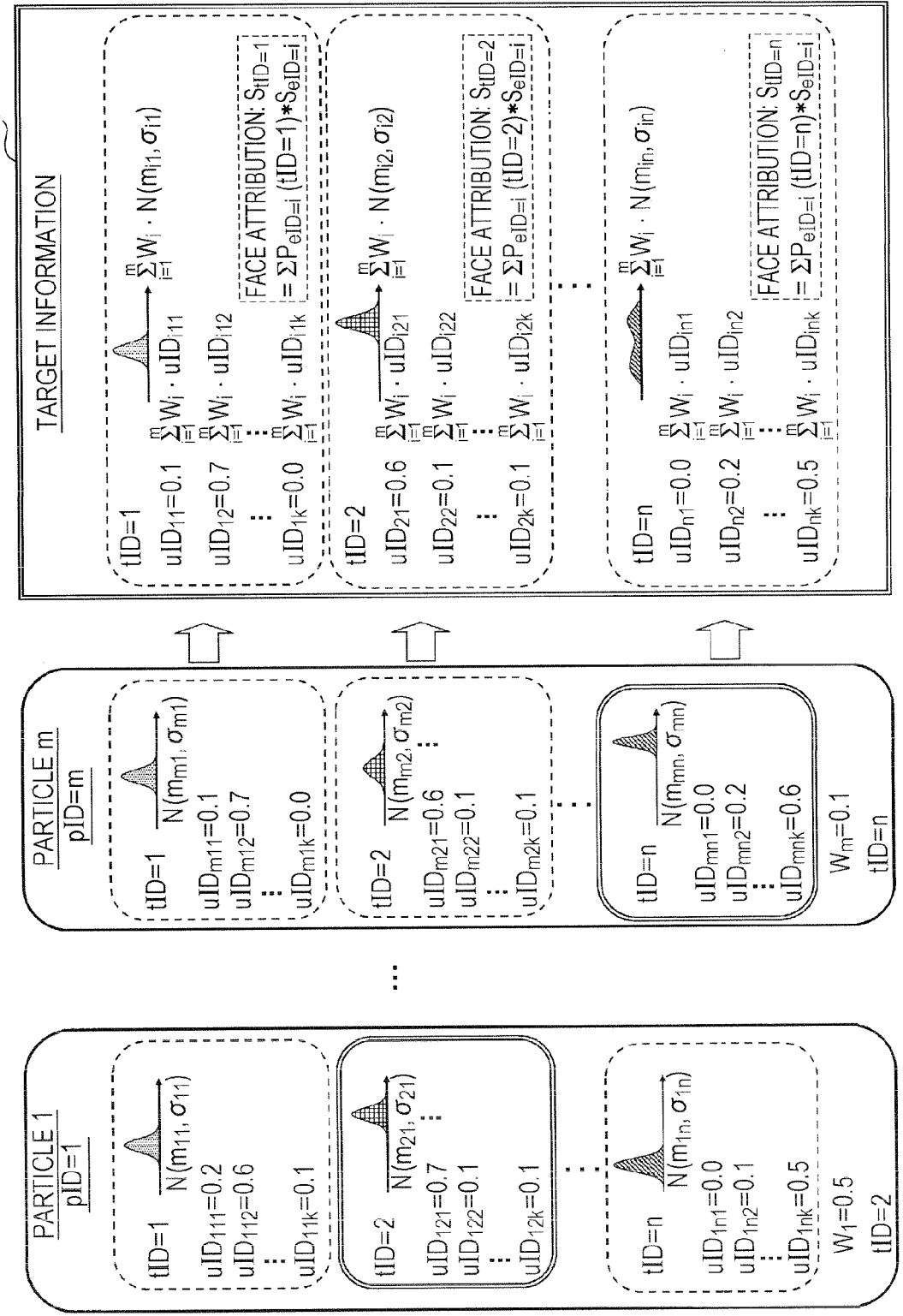
FIG. 7 is a diagram illustrating a configuration and a generation process of target information.

As shown in target information 380 shown on the right-hand side of FIG. 7, the target information is generated as weighted sum data of correspondence data of each target (tID=1 to n) included in each of the particles (pID=1 to m). In FIG. 7, m-number of particles (pID=1 to m) of the information integration processing unit 131, and target information 380 generated from the m-number of particles (pID=1 to m) are shown. The weight of each particle will be described later.

The target information 380 is information indicating (a) a presence position, (b) who the user is (from among users uID1 to uIDk), and (c) an expected value of face attribute (expected value (probability) of being an utterer in this embodiment) with respect to targets (tID=1 to n) corresponding to a virtual user set in advance by the information integration processing unit 131.

The (c) expected value of the face attribute of each target (expected value (probability) being an utterer in this embodiment) is calculated based on a probability $P_{eID=x}$(tID=y) corresponding to the signal information indicating the event generation source as described above, and a face attribute score $S_{eID=i}$ corresponding to each of the events. Here, 'i' denotes an event ID.

For example, the expected value of the face attribute of the target ID=1: $S_{tID=1}$ is calculated from the following Equation.

When $S_{tID=1}=\Sigma_{eID}P_{eID=i}(tID=1) \times S_{eID=i}$ is generalized and shown, the expected value of the face attribute of the target: $S_{tID}$ is calculated from the following Equation.

$$S_{tID}=\Sigma_{eID}P_{eID=i}(tID) \times S_{eID} \qquad \text{<Equation 1>}$$

Figure 8:
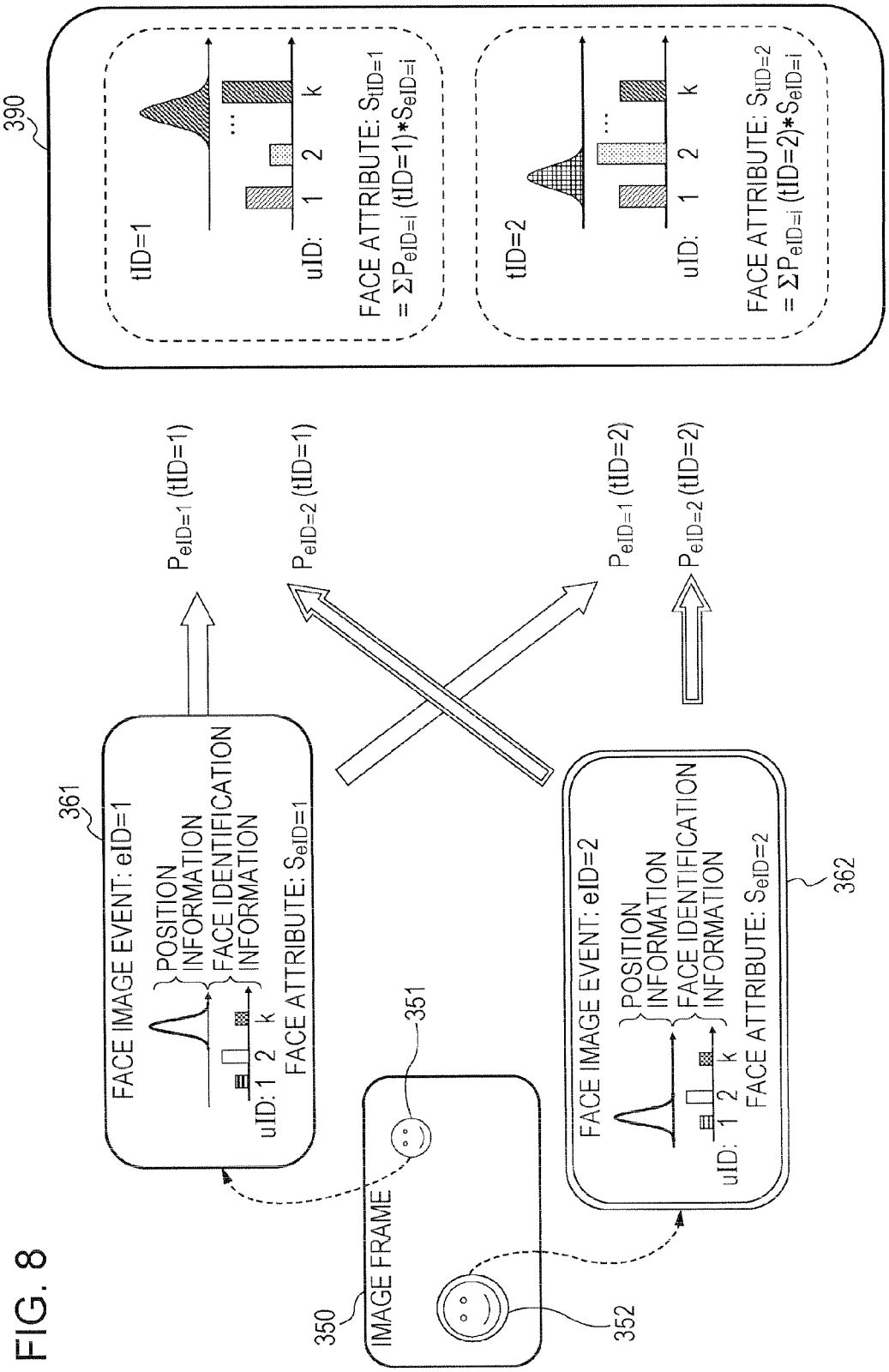
FIG. 8 is a diagram illustrating a configuration and a generation process of target information.

For example, as shown in FIG. 5, in a case where two targets are present within a system, a calculation example of an expected value of a face attribute of each target (tID=1, 2) when two face image events (eID=1, 2) is input to the information integration processing unit 131 from the image event detection unit 112 within a frame of an image 1 is shown in FIG. 8.

Data shown in a right end of FIG. 8 is target information 390 corresponding to target information 380 shown in FIG. 7, and is corresponding to information generated as weighted sum data of correspondence data of each of the targets (tID=1 to n) included in each of the particles (pID=1 to m).

A face attribute of each of the targets in the target information 390 is calculated based on a probability $P_{eID=x}(tID=y)$ corresponding to the signal information indicating the event generation source as described above, and a face attribute score $S_{eID=i}$ corresponding to each event. Here, "i" is an event ID.

An expected value of a face attribute of a target ID=1: $S_{tID=1}$ is represented as $S_{tID=1}=\Sigma_{eID}P_{eID=i}(tID=1)\times S_{eID=i}$, and an expected value of a face attribute of a target ID=2: $S_{tID=2}$ is represented as $S_{tID=2}=\Sigma_{eID}P_{eID=i}(tID=2)\times S_{eID=i}$. A sum of all targets of the expected value of the face attribute of each target: $S_{tID}$ becomes [1]. In this embodiment, since expected values 1 to 0 of face attribute: $S_{tID}$ is set with respect each of the targets, a target having a high expected value is determined such that a probability of being an utterer is high.

In addition, when a face attribute score $[S_{eID}]$ is not present in the face image event eID (for example, when a movement of a mouth is not detected due to a hand covering the mouth even though a face is detected), a value $S_{prior}$ of prior knowledge, or the like is used in the face attribute score $S_{eID}$. As the value of prior knowledge, when a value previously obtained is present for each target, the value is used, or an average value of the face attribute that is calculated from the face image event obtained in the off-line in advance is used.

The number of targets and the number of the face image events within the frame of the image 1 is not typically the same. Since a sum of probability $P_{eID}(tID)$ corresponding to the signal information indicating the above described event generation source does not become [1] when the number of targets is greater than the number of the face image events, even a sum of expected values with respect to each target of the above described calculation equation of the expected value of the face attribute of each target, that is, $S_{tID}=\Sigma_{eID}P_{eID=i}(tID)\times S_{eID}$ (Equation 1) does not become [1], so that an expected value with high accuracy is not calculated.

Figure 9:
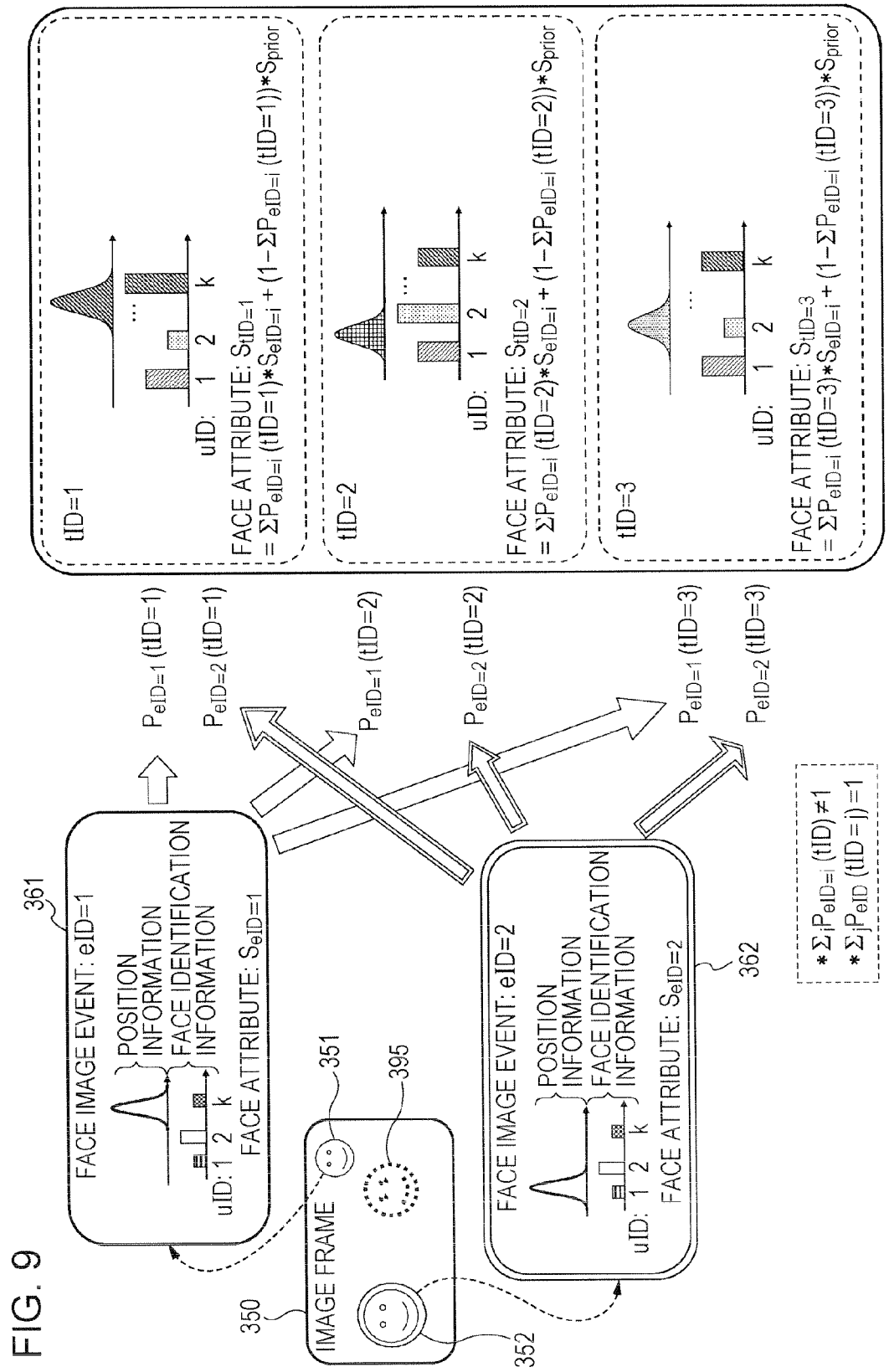
FIG. 9 is a diagram illustrating a configuration and a generation process of target information.

As shown in FIG. 9, when a third face image 395 corresponding to a third event present in a previous processing frame is not detected in the image frame 350, the sum of the expected values with respect to each of the targets shown in the above Equation 1 is not [1], and the expected value with high accuracy is not calculated. In this case, the expected value calculation equation of the face attribute of each target is changed. That is, so that the sum of the expected values $S_{tID}$ of the face attribute of each target is [1], the expected value $S_{tID}$ of the face event attribute is calculated in the following Equation 2 using a complement $[1-\Sigma_{eID}P_{eID}(tID)]$ and the value prior $[S_{prior}]$ knowledge.

$$S_{tID}=\Sigma_{eID}P_{eID}(tID)\times S_{eID}+(1-\Sigma_{eID}P_{eID}(tID))\times S_{prior} \quad \text{<Equation 2>}$$

In FIG. 9, three targets corresponding to an event are set within a system, however, a calculation example of an expected value of face attribute when only two targets are input as the face image event within a frame of an image 1 from the image event detection unit 112 to the information integration processing unit 131 is illustrated.

The calculation is performed such that an expected value of face attribute of target ID=1: $S_{tID=1}$ is $S_{tID=1}=\Sigma_{eID}P_{eID=i}(tID=1)\times S_{eID=i}+(1-\Sigma_{eID}P_{eID}(tID=1))\times S_{prior}$, an expected value of face attribute of target ID=2: $S_{tID=2}$ is $S_{tID=2}=\Sigma_{eID}P_{eID=i}(tID=2)\times S_{eID=i}+(1-\Sigma_{eID}P_{eID}(tID=2))\times S_{prior}$, and an expected value of face attribute of target ID=3: $S_{tID=3}$ is $S_{tID=3}=\Sigma_{eID}P_{eID=i}(tID=3)\times S_{eID=i}+(1-\Sigma_{eID}P_{eID}(tID=3))\times S_{prior}$.

Conversely, when the number of targets is less than the number of the face image events, the targets are generated so that the number of targets is the same as that of the events, and an expected value $[S_{tID=1}]$ of the face attribute of each target is calculated by applying the above Equation 1.

In addition, the face attribute is described as the face attribute expected value based on a score corresponding to the movement of the mouth in this embodiment, that is, as data indicating an expected value in which each target is an utterer, however, the face attribute score, as described above, is able to be calculated as a score such as a smiling face or an age, and the face attribute expected value in this case is calculated as data corresponding to attribute corresponding to the score.

The target information is sequentially updated accompanying the updating of the particles, and, for example, when users 1 to k do not move within a real environment, each of the users 1 to k converges as data corresponding to each of k-number selected from n-number of targets tID=1 to n.

For example, user confirmation degree information (uID) included in data of a top target 1 (tID=1) within target information 380 shown in FIG. 7 has the highest probability with respect to a user 2 ($uID_{12}$=0.7). Accordingly, data of this target 1 (tID=1) is estimated to be corresponding to the user 2. In addition, 12 of $uID_{12}$ within data $[uID_{12}$=0.7] indicating user confirmation degree information uID is a probability of being corresponding to user confirmation degree information uID of user=2 of target ID=1.

In data of a top target 1 (tID=1) within this target information 380, a probability of being a user 2 is the highest, and the user 2 is estimated to be within a range shown in the presence probability distribution data in which a presence position of the user 2 is included in the data of the top target 1 (tID=1) of the target information 380.

In this manner, the target information 380 is information indicating (a) a presence position, (b) who the user is (from among users uID1 to uIDk), and (c) an expected value of face attributes (expected value (probability) of being an utterer in this embodiment), with respect to each of the targets (tID=1 to n) initially set as a virtual object (virtual user). Accordingly, each of k-number of target information of each target (tID=1 to n) converges to be corresponding to the users 1 to k when the user does not move.

As described above, the information integration processing unit 131 performs updating of the particles based on the input information, and generates (a) target information as estimated information concerning a position of a plurality of users, and who each of the plurality of users is, and (b) signal information indicating the event generation source such as a user who is speaking to thereby output the generated information to the processing determination unit 132.

In this manner, the target information updating unit 141 of the information integration processing unit 131 performs particle filtering process to which a plurality of particles setting a plurality of target data corresponding to a virtual user are applied, and generates analysis information including position information of a user present in a real space. That is, each packet of target data set in particles is set to be associated with each event input from the event detection unit, and updating of target data corresponding to the event selected from each of the particles according to an input event identifier.

In addition, the target information updating unit 141 calculates an inter-event generation source hypothesis target likelihood set in each of the particles and the event information input from the event detection unit, and sets a value corresponding to the scale of the likelihood as a weight of the particle in each of the particles, so that a re-sampling process preferentially selecting a particle having a large weight is performed to update the particles. This process will be described later. In addition, with respect to the target set in each of the particles, updating over time is performed. In addition, according to the number of the event generation source hypothesis targets set in each of the particles, the signal information is generated as a probability value of the event generation source.

Meanwhile, the utterance source probability calculation unit 142 of the information integration processing unit 131 inputs the voice event information detected in the voice event detection unit 122, and calculates a probability in which each target is an utterance source of the input voice event using an identification model (identifier). The utterance source probability calculation unit 142 generates signal information concerning a voice event based on the calculated value, and outputs the generated information to the processing determination unit 132.

Details of the process performed by the utterance source probability calculation unit 142 will be described later.

[3. Processing Sequence Performed by the Information Processing Apparatus of the Present Disclosure]

Next, a processing sequence performed by the information integration processing unit 131 will be described with reference to the flowchart shown in FIG. 10.

The information integration processing unit 131 inputs event information shown in FIG. 3B from the voice event detection unit 122 and the image event detection unit 112, that is, the user position information and the user identification information (face identification information or utterer identification information), generates (a) target information as estimated information concerning a position of a plurality of users, and who each of the plurality of users is, and (b) signal information indicating an event generation source of, for example, a user, or the like who is speaking, and outputs the generated information to the processing determination unit 132. This processing sequence will be described with reference to the flowchart shown in FIG. 10.

First, in step S101, the information integration processing unit 131 inputs event information such as (a) user position information, (b) user identification information (face identification information or utterer identification information), and (c) face attribute information (face attribute score) from the voice event detection unit 122 and the image event detection unit 112.

When acquisition of the event information is successfully performed, the process proceeds to step S102, and when the acquisition of the event information is wrongly performed, the process proceeds to step S121. The process of step S121 will be described later.

When the acquisition of the event information is successfully performed, the information integration processing unit 131 determines whether a voice event is input in step S102. When the input event is the voice event, the process proceeds to step S111, and when the input event is an image event, the process proceeds to step S103.

When the input event is the voice event, in step S111, a probability in which each target is an utterance source of the input voice event is calculated using an identification model (identifier). The calculated result is output to the processing determination unit 132 (see FIG. 2) as the signal information based on the voice event. Details of step S111 will be described later.

When the input event is the image event, in step S103, updating of a particle based on the input information is performed, however, whether setting of a new target has to be performed with respect to each of the particles is determined in step S103 before performing the updating of the particle. In a configuration of the disclosure, each target 1 to n included in each of particles 1 to m set in the information integration processing unit 131 is able to be associated with each of the input event information (eID=1 to k), as described with reference to FIG. 5, and updating of the selected target corresponding to the input event is performed according to the association.

Accordingly, when the number of events input from the image event detection unit 112 is larger than the number of the targets, setting of a new target has to be performed. Specifically, this corresponds to a case in which a face that was not present until now appears in an image frame 350 shown in FIG. 5. In this case, the process proceeds to step S104, so that a new target is set in each particle. This target is set as a target updated to be equivalent with the new event.

Next, in step S105, hypothesis of an event generation source is set in each of m-number of particles (pID=1 to m) of particles 1 to m set in the information integration processing unit 131. As for the event generation source, for example, when the event generation source is a voice event, a user who is speaking is the event generation source, and when the event generation source is the image event, a user having an extracted face is the event generation source.

A process of setting the hypothesis of the present disclosure is performed such that each of the input event information items (eID=1 to k) is set to be associated with each of the targets 1 to n included in each of the particles 1 to m, as described with reference to FIG. 5.

That is, as described with reference to FIG. 5, each of the targets 1 to n included in each of the particles 1 to m is associated with each of the events information (eID=1 to k), and updating which target included in each of the particles is set in advance. In this manner, the event generation source hypothesis by the acquisition event is generated in each of the particles so that overlap does not occur. In addition, initially, for example, a setting in which each event is uniformly distributed may be used. Since the number of particles: m is set to be larger than the number of targets: n, a plurality of particles is set as particles having correspondence of the same event ID-target ID. For example, when the number of targets: n is 10, a process in which the number of particles: m=100 to 1000 is set is performed.

When the setting of the hypothesis is completed in step S105, the process proceeds to step S106. In step S106, a weight corresponding to each particle, that is, a particle weight [$W_{pID}$] is calculated. As for the particle weight [$W_{pID}$], a uniform value is initially set to each particle, however, updating is performed according to the event input.

A calculation process of the particle weight [$W_{pID}$] will be described in detail with reference to FIG. 11. The particle weight [$W_{pID}$] corresponds to an index of correctness hypothesis of each particle generating a hypothesis target of the event generation source. The particle weight [$W_{pID}$] is calculated as likelihood between the event and the target, that is, the similarity with the input event of the event generation source that is able to be associated with each of the plurality of targets set in each of the m-number of particles (pID=1 to m).

Figure 11:
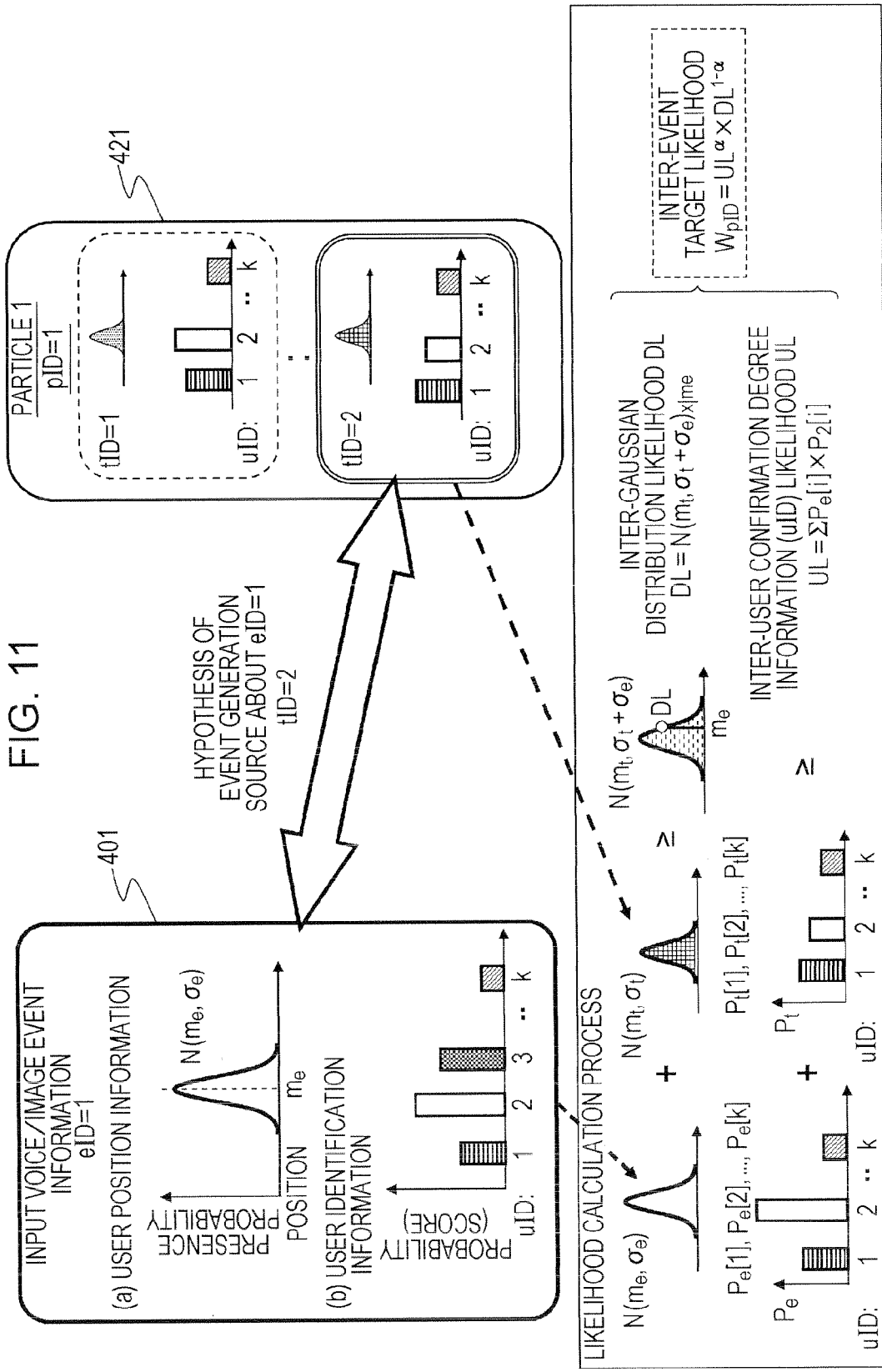
FIG. 11 is a diagram illustrating a calculation process of a particle weight, in detail.

In FIG. 11, the information integration processing unit 131 shows event information 401 corresponding to a single event (eID=1) input from the voice event detection unit 122 and the image event detection unit 112, and a single particle 421 maintained by the information integration processing unit 131. A target (tID=2) of the particle 421 is a target being able to be associated with an event (eID=1).

In a lower end of FIG. 11, a calculation processing example of likelihood between the event and the target is shown. The particle weight [$W_{pID}$] is calculated as a value corresponding to a sum of likelihood between the event and the target as the similarity index between the event and the target calculated in each particle.

The process of calculating the likelihood shown in a lower end of FIG. 11 is performed such that (a) inter-Gaussian distribution likelihood [DL] as similarity data between an event with respect to user position information and target data, and (b) inter-user confirmation degree information (uID) likelihood [UL] as similarity data between an event with respect to user identification information (face identification information or utterer identification information) and target data are separately calculated.

A calculation process of the inter-Gaussian distribution likelihood [DL] as the similarity data between the (a) events with respect to the user position information and hypothesis target is the following process.

When Gaussian distribution corresponding to user position information within input event information is $N(m_e, \sigma_e)$, and Gaussian distribution corresponding to user position information of a hypothesis target selected from a particle is $N(m_t, \sigma_t)$, the inter-Gaussian distribution likelihood [DL] is calculated by the following equation.

$$DL = N(m_t, \sigma_t + \sigma_e) x | m_e$$

In the above equation, a value of a position of $x = m_e$ in the Gaussian distribution of distribution $\sigma_t + \sigma_e$ in a center $m_t$.

(b) The calculation process of the inter-user confirmation degree information (uID) likelihood [UL] as similarity data between an event for user identification information (face identification information or utterer identification information) and a hypothesis target is performed as below.

It is assumed that a value of confirmation degree each user 1 to k of user confirmation degree information (uID) within the input event information is Pe[i]. In addition, "i" is a variable corresponding to user identifiers 1 to k.

The inter-user confirmation degree information (uID) likelihood [UL] is calculated by the following equation using, as Pt[i], a value (score) of confirmation degree of each of the users 1 to k of the user confirmation degree information (uID) of the hypothesis target selected from the particle.

$$UL = \Sigma P_e[i] \times P_t[i]$$

In the above equation, a sum of products of values (score) of respective corresponding user confirmation degrees included in user confirmation degree information (uID) of two items of data is obtained, and the obtained sum is used as the inter-user confidence degree information (uID) likelihood [UL].

The particle weight [$W_{pID}$] is calculated by the following equation using a weight α (α=0 to 1) based on the above two likelihoods, that is, the inter-Gaussian distribution likelihood [DL] and the inter-user confirmation degree information (uID) likelihood [UL].

$$[W_{pID}] = \Sigma_n UL^\alpha \times DL^{1-\alpha}$$

Here, n denotes the number of targets corresponding to an event included in a particle. Using the above equation, the particle weight [$W_{pID}$] is calculated. However, α=0 to 1. The particle weight [$W_{pID}$] is calculated with respect to each of the particles.

The weight [α] applied to the calculation of the particle weight [$W_{pID}$] may be a predetermined fixed value, or a value changed according to an input event value. For example, when the input event is an image, face detection is successfully performed to acquire position information, however, when face identification is wrongly performed, the inter-user confirmation degree information (uID) likelihood: UL=1 is satisfied as a setting of α=0, so that the particle weight [$W_{pID}$] may be calculated depending on only the inter-Gaussian distribution likelihood [DL]. In addition, when the input event is a voice, utterer identification is successfully performed to acquire utterer information, however, when acquisition of the position information is wrongly performed, the inter-Gaussian distribution likelihood [DL]=1 is satisfied as a setting of α=0, so that the particle weight [$W_{pID}$] may be calculated depending on only the inter-user confirmation degree information (uID) likelihood [UL].

Figure 10:
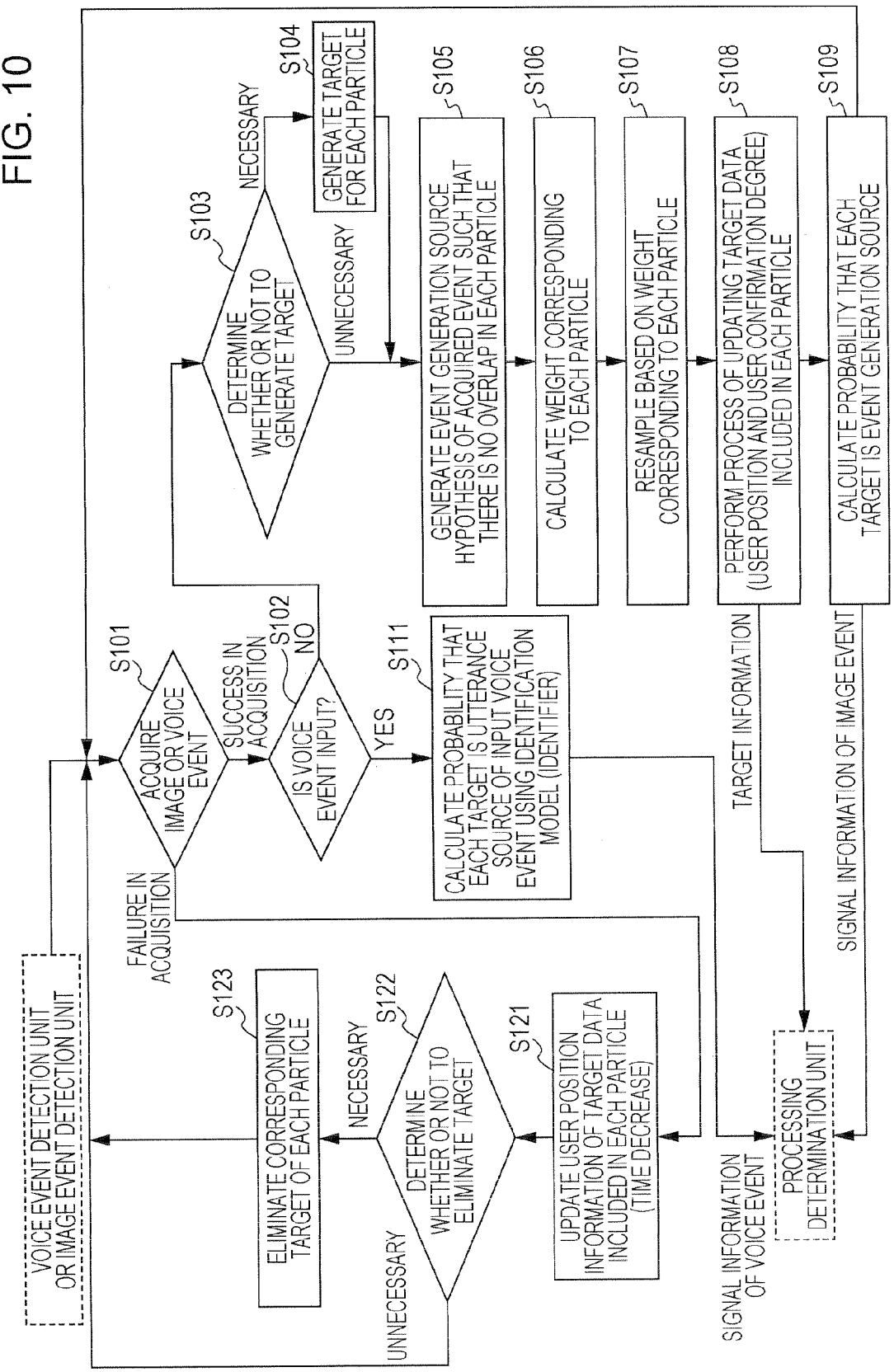
FIG. 10 is a flowchart illustrating a processing sequence performed by an information integration processing unit.

The calculation of the weight [$W_{pID}$] corresponding to each particle in step S106 of the flowchart of FIG. 10 is performed as the process described with reference to FIG. 11.

Next, in step S107, a re-sampling process of the particle based on the particle weight [$W_{pID}$] of each particle set in step S106 is performed.

The re-sampling process of the particle is performed as a process of sorting out the particle according to the particle weight [$W_{pID}$] from m-number of particles. Specifically, for example, in a case of the number of particles: m=5, when the following particle weights are respectively set:
particle 1: particle weight [$W_{pID}$]=0.40,
particle 2: particle weight [$W_{pID}$]=0.10,
particle 3: particle weight [$W_{pID}$]=0.25,
particle 4: particle weight [$W_{pID}$]=0.05, and
particle 5: particle weight [$W_{pID}$]=0.20.

The particle 1 is re-sampled with 40% probability, and the particle 2 is re-sampled with 10% probability. In addition, in fact m=100 to 1,000, and the re-sampled result is configured by particles having a distribution ratio corresponding to the particle weight.

Through this process, more particles having large particle weight [$W_{pID}$] remain. In addition, even after the re-sampling, the total number of particles [m] is not changed. In addition, after the re-sampling, the weight [$W_{pID}$] of each particle is re-set, and the process is repeatedly performed according to input of a new event from step S101.

In step S108, updating of target data (user position and user confirmation degree) included in each particle is performed. As described with reference to FIG. 7, each target is configured by data such as:

(a) user position: probability distribution of a presence position corresponding to each target [Gaussian distribution: $N(m_t, \sigma_t)$], (b) establishment value (score) of being users 1 to k: Pt[i] (i=1 to k) as user confirmation degree: user confirmation degree information (uID) indicating who each target, that is, $$uID_{t1} = Pt[1]$$
$$uID_{t2} = Pt[2]$$
$$...$$
$$uID_{tk} = Pt[k],$$

and (c) expected value of face attribute (expected value (probability) being an utterer in this embodiment).

The (c) expected value of face attribute (expected value (probability) being an utterer in this embodiment) is calculated based on a probability $P_{eID=x}(tID=y)$ corresponding to the above described signal information indicating the event generation source and a face attribute score $S_{eID=i}$ corresponding to each event. Here, "i" is an event ID. For example, an expected value of a face attribute of target ID=1: $S_{tID=i}$ is calculated by the following equation.

$$S_{tID=1} = \Sigma_{eID} P_{eID=i}(tID=1) \times S_{eID=i}$$

When generalized and indicated, the expected value of face attribute of the target: $S_{tID=i}$ is calculated by the following Equation 1.

$$S_{tID} = \Sigma_{eID} P_{eID=i}(tID) \times S_{eID} \qquad \text{<Equation 1>}$$

In addition, when the number of targets is larger than the number of face image events, such that a sum of expected values [$S_{tID}$] of face attribute of each target is [1], the expected value $S_{tID}$ of the face event attribute is calculated in the following equation 2 using a complement $[1-\Sigma_{eID} P_{eID}(tID)]$ and the value prior [$S_{prior}$] knowledge.

$$S_{tID} = \Sigma_{eID} P_{eID}(tID) \times S_{eID} + (1-\Sigma_{eID} P_{eID}(tID)) \times S_{prior} \qquad \text{<Equation 2>}$$

The updating of the target data in step S108 is performed with respect to each of (a) user position, (b) user confirmation degree, and (c) expected value of face attribute (expected value (probability) being an utterer in this embodiment). First, the updating of (a) user position will be described.

The updating of (a) user position is performed as updating of the following two stages such as (a1) updating with respect to all targets of all particles, and (a2) updating with respect to event generation source hypothesis target set in each particle.

The (a1) updating with respect to all targets of all particles is performed with respect to targets selected as the event generation source hypothesis target and other targets. This updating is performed based on the assumption that dispersion of the user position is expanded over time, and the updating is performed, using the Kalman filter, by the elapsed time and the position information of the event from the previous updating process.

Hereinafter, an updating processing example in a case in which the position information is a one-dimension will be described. First, when the elapsed time after the time of the previous updating process is [dt], prediction distribution of the user position after dt is calculated with respect to all targets. That is, the following updating is performed with respect to Gaussian distribution as distribution information of the user position: expected value (average) of $N(m_t, \sigma_t)$: [$m_t$], and distribution [$\sigma_t$].

$$m_t = m_t + xc \times dt$$

$$\sigma_t^2 = \sigma_t^2 + \sigma c^2 \times dt$$

Here, $m_t$ denotes a predicted expectation value (predicted state), $\sigma_t^2$ denotes a predicted covariance (predicted estimation covariance), xc denotes movement information (control model), and $\sigma c^2$ denotes noise (process noise).

In addition, in a case of performing the updating under a condition where the user does not move, the updating is performed using xc=0.

By the above calculation process, Gaussian distribution: $N(m_t, \sigma_t)$ as the user position information included in all targets is updated.

Next, the (a2) updating with respect to event generation source hypothesis target set in each particle will be described.

In step S104, a target selected according to the set event generation source hypothesis is updated. First, as described with reference to FIG. 5, each of the targets n included in each of the particles 1 to m are set as targets being able to be associated with each of the events (eID=1 to k).

That is, which target included in each of the particles is updated according to the event ID (eID) is set in advance, and only targets being able to be associated with the input event are updated based on the setting. For example, by event correspondence information 361 of [event ID=1(eID=1)] shown in FIG. 5, only data of the target ID=1(tID=1) is selectively updated in the particle 1 (pID=1).

In the updating process performed based on the event generation source hypothesis, the updating of the target being able to be associated with the event is performed. The updating process using Gaussian distribution: $N(m_e, \sigma_e)$ indicating the user position included in the event information input from the voice event detection unit 122 or the image event detection unit 112 is performed.

For example, when it is assumed that K denotes Kalman Gain, $m_e$ denotes an observed value (observed state) included in input event information: $N(m_e, \sigma_e)$, and $\sigma_e^2$ denotes an observed value (observed covariance) included in the input event information: $N(m_e, \sigma_e)$, the following updating is performed:

$$K = \sigma_t^2/(\sigma_t^2 + \sigma_e^2)$$

$$m_t = m_t + K(xc - m_t), \text{ and}$$

$$\sigma_t^2 = (1-K)\sigma_t^2.$$

Next, the (b) updating of the user confirmation degree performed as the updating process of the target data will be described. In the target data, a probability (score) being each user 1 to k: Pt[i] (i=1 to k) as the user confirmation degree information (uID) indicating who each target is, other than the user position information is included. In step S108, an updating process with respect to the user confirmation degree information (uID) is performed.

The updating with respect to the user confirmation degree information (uID) of the target included in each particle: Pt[i] (i=1 to k) is performed by a posterior probability of all of the registered users, and the user confirmation degree information (uID): Pe[i] (i=1 to k) included in the event information input from the voice event detection unit 122 or the image event detection unit 112, by applying an update rate [β] having a value of a range of 0 to 1 set in advance.

The updating with respect to the user confirmation degree information (uID) of the target: Pt[i] (i=1 to k) is performed by the following equation.

$$Pt[i] = (1-\beta) \times Pt[i] + \beta * Pe[i]$$

Here, i=1 to k, and β=0 to 1. In addition, the update rate [β] corresponds to a value of 0 to 1, and is set in advance.

In step S108, the following data included in the updated target data, that is, (a) user position: probability distribution of presence position corresponding to each target [Gaussian distribution: $N(m_t, \sigma_t]$, (b) establish value (score) being each user 1 to k: Pt[i] (i=1 to k) as user confirmation degree: user confirmation degree information (uID) indicating who each target is, that is, $$uID_{t1} = Pt[1]$$

$$uID_{t2} = Pt[2]$$

$$\ldots$$

$$uID_{tk} = Pt[k],$$

and
(c) expected value of face attribute (expected value (probability) being an utterer in this embodiment).

The target information is generated based on the above described data and each particle weight [$W_{pID}$], and outputs the generated target information to the processing determination unit 132.

In addition, the target information is generated as weighted sum data of correspondence data of each target (tID=1 to n) included in each of the particles (pID=1 to m). The target information is data shown in the target information 380 shown in a right end of FIG. 7. The target information is generated as information including (a) user position information, (b) user confirmation degree information, and (c) expected value of face attribute (expected value (probability) being an utterer in this embodiment) of each of the targets (tID=1 to n).

For example, user position information of the target information corresponding to the target (tID=1) is represented as the following Equation A.

$$\sum_{i=1}^{m} W_i \cdot N(m_{i1}, \sigma_{i1})$$ (Equation A)

In the above Equation, $W_i$ denotes a particle weight $[W_{pID}]$.

In addition, user confirmation degree information of the target information corresponding to the target (tID=1) is represented as the following Equation B.

$$\sum_{i=1}^{m} W_i \cdot uID_{i11}$$ (Equation B)

$$\sum_{i=1}^{m} W_i \cdot uID_{i12}$$

$$\vdots$$

$$\sum_{i=1}^{m} W_i \cdot uID_{i1k}$$

In the above Equation B, $W_i$ denotes a particle weight $[W_{pID}]$.

In addition, an expected value (expected value (probability) being an utterer in this embodiment) of face attribute of the target information corresponding to the target (tID=1) is represented as $S_{tID=1} = \Sigma_{eID} P_{eID=i}(tID=1) \times S_{eID=i}$ or $S_{tID=1} = \Sigma_{eID} P_{eID=i}(tID=1) \times S_{eID=i} + (1 - \Sigma_{eID} P_{eID=i}(tID=1)) \times S_{prior}$.

The information integration processing unit 131 calculates the above described target information with respect to each of n-number of targets (tID=1 to n), and outputs the calculated target information to the processing determination unit 132.

Next, a process of step S109 shown in the flowchart of FIG. 8 will be described. In step S109, the information integration processing unit 131 calculates a probability in which each of n-number of targets (tID=1 to n) is a generation source of the event, and outputs the calculated probability as the signal information to the processing determination unit 132.

As described above, the signal information indicating the event generation source is data indicating who is speaking, that is, data indicating an utterer with respect to the voice event, and is data indicating who a face included in an image belongs to and data indicating the utterer with respect to the image event.

The information integration processing unit 131 calculates a probability in which each target is the event generation source, based on the number of hypothesis targets of the event generation source set in each particle. That is, the probability in which each target (tID=1 to n) is the event generation source is represented as [P(tID=i)]. Here, i=1 to n. For example, a probability in which a generation source of any event (eID=y) is a specific target x(tID=x) is represented as $P_{eID=x}(tID=y)$ as described above, and is corresponding to a ratio between the number of particles set in the information integration processing unit 131: m and the number of targets allocated to each event. For example, in the example shown in FIG. 5, the following correspondence relationship is obtained:

$P_{eID=1}(tID=1)$=[the number of particles allocating tID=1 to a first event (eID=1)/(m)], $P_{eID=1}(tID=2)$=[the number of particles allocating tID=2 to a first event (eID=1)/(m)], $P_{eID=2}(tID=1)$=[the number of particles allocating tID=1 to second event (eID=2)/(m)], and $P_{eID=2}(tID=2)$=[the number of particles allocating tID=2 to second event (eID=2)/(m)].

This data is output to the processing determination unit 132 as the signal information indicating the event generation source.

When the process of step S109 is completed, the process returns to step S101 to thereby proceed to a waiting state for input of the event information from the voice event detection unit 122 and the image event detection unit 112.

As above, the descriptions of steps S101 to S109 shown in FIG. 10 have been made. When the information integration processing unit 131 does not acquire the event information shown in FIG. 3B from the voice event detection unit 122 and the image event detection unit 112 in step S101, updating of configuration data of the target included in each of the particles is performed in step S121. This updating is a process considering a change in the user position over time.

The updating of the target is the same process as the (a1) updating with respect to all targets of all particles described in step S108, is performed based on the assumption that dispersion of the user position is expanded over time, and is performed, using the Kalman filter, by the elapsed time and the position information of the event from the previous updating process.

Hereinafter, an updating processing example in a case in which the position information is a one-dimension will be described. First, the predicted calculation of the user position after dt is calculated with the elapsed time [dt] from the previous updating process for all targets. That is, the following updating is performed with respect to Gaussian distribution as distribution information of the user position: expected value (average) of N $(m_t, \sigma_t)$: $[m_t]$, and distribution $[\sigma_t]$.

$$m_t = m_t + xc \times dt$$

$$\sigma_t^2 = \sigma_t^2 + \sigma c^2 \times dt$$

Here, $m_t$ denotes a predicted expectation value (predicted state), $\sigma_t^2$ denotes a predicted covariance (predicted estimation covariance), xc denotes movement information (control model), and $\sigma c^2$ denotes noise (process noise).

In addition, in a case of performing the updating under a condition where the user does not move, the updating is performed using xc=0.

By the above calculation process, Gaussian distribution: $N(m_t, \sigma_t)$ as the user position information included in all targets is updated.

In addition, unless a posterior probability of all of the registered users of the event or a score [Pe] from the event information is acquired, the updating with respect to the user confirmation degree information (uID) included in a target of each particle is not performed.

After the process of step S121 is completed, whether elimination of the target is necessary or unnecessary is determined in step 122, and when the elimination of the target is necessary, the target is eliminated in step S123. The elimination of the target is performed as a process of eliminating data in which a specific user position is not obtained, such as a case in which a peak is not detected in the user position information included in the target, and the like. When the above described data is absent, steps S122 to S123 in which the elimination is unnecessary are performed, and then the process returns to step S101 to thereby proceed to a waiting state for input of the event information from the voice event detection unit 122 and the image event detection unit 112.

As above, the process performed by the information integration processing unit 131 has been described with reference to FIG. 10. The information integration processing unit 131 repeatedly performs the process based on the flowchart shown in FIG. 10 for each input of the event information from the voice event detection unit 122 and the image event detection unit 112. By this repeatedly performed process, a weight of the particle in which more reliable target is set as a hypothesis target is increased, and particles with larger weights remain through the re-sampling process based on the particle weight. Consequently, highly reliable data similar to the event information input from the voice event detection unit 122 and the image event detection unit 112 remains, so that the following highly reliable information, that is, (a) target information as estimated information indicating a position of each of a plurality of users, and who each of the plurality of users is, and, for example, (b) signal information indicating the event generation source such as the user who is speaking are ultimately generated, and the generated information is output to the processing determination unit 132.

In addition, in the signal information, two items of signal information such as (b1) signal information based on a voice event generated by the process of step S111, and (b2) signal information based on an image event generated by the process of steps S103 to 109 are included.

[4. Details of a Process Performed by Utterance Source Probability Calculation Unit]

Next, a process of step S111 shown in the flowchart of FIG. 10, that is, a process of generating signal information based on a voice event will be described in detail.

As described above, the information integration processing unit 131 shown in FIG. 2 includes the target information updating unit 141 and the utterance source probability calculation unit 142.

The target information updated for each the image event information in the target information updating unit 141 is output to the utterance source probability calculation unit 142.

The utterance source probability calculation unit 142 generates the signal information based on the voice event by applying the voice event information input from the voice event detection unit 122 and the target information updated for each the image event information in the target information updating unit 141. That is, the above described signal information is signal information indicating how much each target resembles an utterance source of the voice event information, as the utterance source probability.

When the voice event information is input, the utterance source probability calculation unit 142 calculates the utterance source probability indicating how much each target resembles the utterance source of the voice event information using the target information input from the target information updating unit 141.

Figure 12:
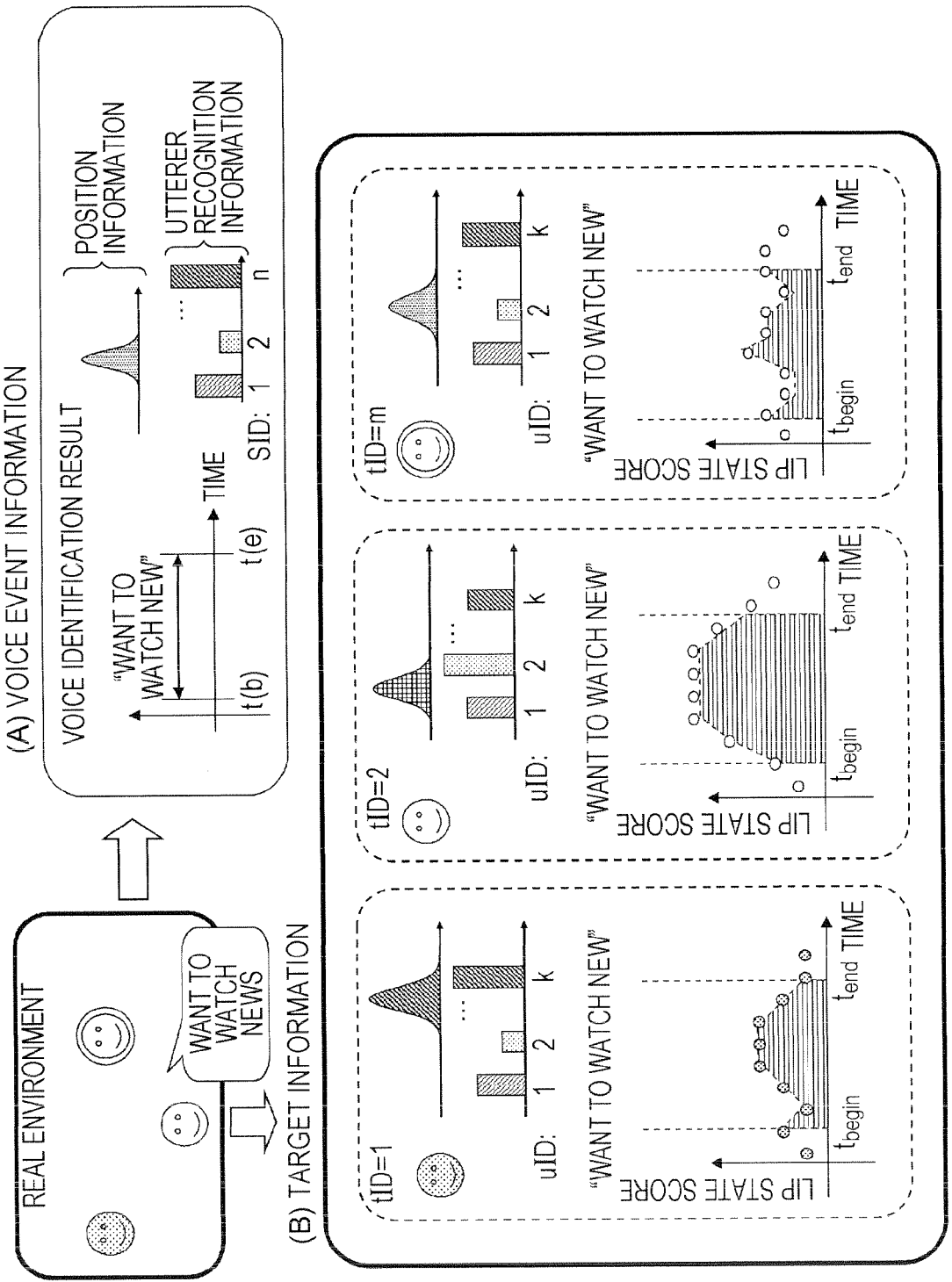
FIG. 12 is a diagram illustrating an utterer specification process.

In FIG. 12, an example of input information such as (A) voice event information, and (B) target information which are input to the utterance source probability calculation unit 142 is shown.

The (A) voice event information is voice event information input from the voice event detection unit 122.

The (B) target information is target information updated for each image event information in the target information updating unit 141.

In the calculation of the utterance source probability, sound source direction information (position information) or utterer identification information included in the voice event information shown in (A) of FIG. 12, lip movement information included in the image event information, or target position n or the total number of targets included in the target information are used.

In addition, the lip movement information originally included in the image event information is supplied to the utterance source probability calculation unit 142 from the target information updating unit 141, as one item of the face attribute information included in the target information.

In addition, the lip movement information in this embodiment is generated from a lip state score obtainable by applying the visual speech detection technique. In addition, the visual speech detection technique is described in, for example, [Visual lip activity detection and speaker detection using mouth region intensities/IEEE Transactions on Circuits and Systems for Video Technology, Volume 19, Issue 1 (January 2009), Pages: 133-137 (see, URL: http://poseidon.csd.auth.gr/papers/PUBLISHED/JOURNAL/pdf/Siatras09a)], [Facilitating Speech Detection in Style!: The Effect of Visual Speaking Style on the Detection of Speech in Noise Auditory-Visual Speech Processing 2005 (see, URL: http://www.isca-speech.org/archive/avsp05/av05_023.html)], and the like, and this technique may be applicable.

An overview of generation method of lip movement information will be as follows.

The input voice event information is corresponding to any time interval Δt, so that a plurality of lip state scores included in a time interval Δt=(t_end to t_begin) are sequentially arranged to obtain time series data. An area of a region including this time series data is used as lip movement information.

A graph of the time/lip state score shown in the bottom of the target information of (B) of FIG. 12 corresponds to the lip movement information.

In addition, the lip movement information is regularized with a sum of the lip movement information of all targets.

In addition, as a process of generating lip movement information, for example, Japanese Unexamined Patent Application Publication No. 2009-223761 or Japanese Patent Publication No. 4462339 is disclosed, and the process disclosed in Publications is applicable.

In addition, as a process of generating sound source direction information, Japanese Unexamined Patent Application Publication No. 2010-20294 is disclosed, as utterer identification information, Japanese Unexamined Patent Application Publication No. 2004-286805 is disclosed, and the existing process may be applied.

As shown in FIG. 12, the utterance source probability calculation unit 142 acquires (a) user position information (sound source direction information), and (b) user identification information (utterer identification information) which are corresponding to uttering as the voice event information input from the voice event detection unit 122.

In addition, the utterance source probability calculation unit 142 acquires information such as (a) user position information, (b) user identification information, and (c) lip movement information, as the target information updated for each the image event information in the target information updating unit 141.

In addition, even information such as the target position or the total number of targets that is included in the target information is input.

The utterance source probability calculation unit 142 generates a probability (signal information) in which each target is an utterance source based on the above described information, and outputs the generated probability to the processing determination unit 132.

An example of a sequence of method of calculating the utterance source probability for each target that is performed by the utterance source probability calculation unit 142 will be described with reference to the flowchart shown in FIG. 13.

Figure 13:
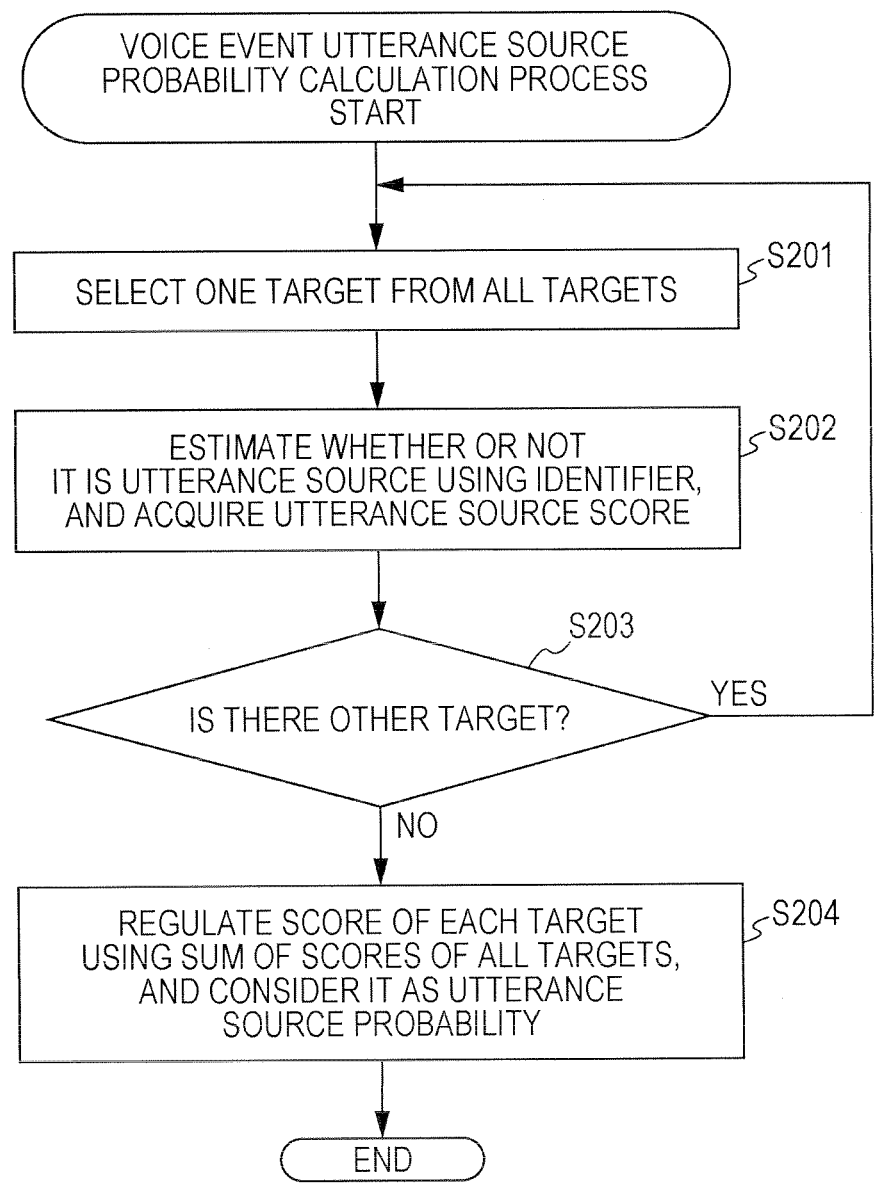
FIG. 13 is a flowchart illustrating an example of a processing sequence performed by an utterance source probability calculation unit.

The processing example shown in the flowchart of FIG. 13 is a processing example using an identifier in which targets are individually selected, and an utterance source probability (utterance source score) indicating whether the target is a generation source is determined from only information of the selected target.

First, in step S201, a single target acting as a target to be processed is selected from all targets.

Next, in step S202, an utterance source score is obtained as a value of a probability whether the selected target is the utterance source using the identifier of the utterance source probability calculation unit 142.

The identifier is an identifier for calculating the utterance source probability for each target, based on input information such as (a) user position information (sound source direction information) and (b) user identification information (utterer identification information) input from the voice event detection unit 122, and (a) user position information, (b) user identification information, (c) lip movement information, and (d) target position or the number of targets input from the target information updating unit 141.

In addition, the input information of the identifier may be all of the above described information, however, only some items of the input information may be used.

In step S202, the identifier calculates the utterance source score as the probability value indicating whether the selected target is the utterance source.

Details of the process of calculating the utterance source score performed in step S202 will be described later in detail with reference to FIG. 14.

In step S203, whether other unprocessed targets are present is determined, and when the other unprocessed targets are present, processes after step S201 are performed with respect to the other unprocessed targets.

In step S203, when the other unprocessed targets are absent, the process proceeds to step S204.

In step S204, the utterance source score obtained for each target is regularized with a sum of the utterance source scores of all of the targets to thereby determine the utterance source score as the utterance source probability that is corresponding to each target.

A target with the highest utterance source score is estimated to be the utterance source.

[5. Process of Calculating an Utterance Source Score]

Next, details of the process of calculating the utterance source score in step S202 in the flowchart shown in FIG. 13 will be described.

The utterance source score is calculated in the utterance source probability calculation unit 142 shown in FIG. 2. That is, the utterance source score as a probability value whether or not the selected target is the utterance source is calculated.

As described above, for example, the utterance source probability calculation unit 142 inputs (a) user position information (sound source direction information), and (b) user identification information (utterer identification information) from the voice event detection unit 122, and inputs (a) user position information, (b) user identification information, (c) lip movement information, and (d) target position or the total number of targets from the target information updating unit 141, to calculate the utterance source score for obtaining the utterance source probability for each target.

The utterance source probability calculation unit 142 may have a configuration of calculating the score using all the information described above, but may have a configuration of calculating the score using a part thereof.

An example of the process of calculating the utterance source score: P to which three kinds of information of sound source direction information: D, utterer identification information: S, and lip movement information: L are applied will be described with reference to FIG. 14 and the subsequence.

The equation of calculating the utterance source score P using the three kinds of information D, S, and L may be defined by the following equation, for example, as shown in FIG. 14.

$$P = D^\alpha \cdot S^\beta \cdot L^\gamma,$$

where

D is sound source direction information,

S is utterer identification information,

L is lip movement information, $\alpha$ is a weight coefficient of sound source direction information, $\beta$ is a weight coefficient of utterer identification information, $\gamma$ is a weight coefficient of lip movement information, and $\alpha + \beta + \gamma = 1$.

The utterance source calculation equation: $P = D^\alpha \cdot S^\beta \cdot L^\gamma$ is applied, and the utterance source score as a probability value whether or not the selected target is the utterance source is calculated.

When the process of calculating the utterance source score to which the utterance source calculation equation: $P = D^\alpha \cdot S^\beta \cdot L^\gamma$ is applied is performed, a condition is that three kinds of information of D: sound source direction information, S: utterer identification information, and L: lip movement information are acquired as input information.

In addition, a process of determining coefficients of $\alpha$: a coefficient of sound source direction information, $\beta$: a weight coefficient of utterer identification information, and $\gamma$: a weight coefficient of lip movement information is necessary.

A sequence of the process of calculating the utterance source score accompanying the process of determining the coefficients for performing the process of calculating the utterance source score to which the calculation equation: $P = D^\alpha \cdot S^\beta \cdot L^\gamma$ described above will be described with reference to the flowchart shown in FIG. 15.

In addition, one voice recognition result included in the voice event input from the voice event detection unit 122 includes the following information.

(1) Voice section information (the start time and the end time of the voice)

(2) Sound source direction information (3) Utterer identification information

The utterance source probability calculation unit 142 adjust all the weight coefficients by changing weights of the lip movement information and the sound source direction information according to whether or not there is time overlap between voice event that is the target of the process of calculating the utterance source score and the just previous sound event, and whether or not there is the other target close in position to the target, to calculate the utterance source score using all the adjusted weight coefficients.

For the process of determining the coefficients ($\alpha$, $\beta$, and $\gamma$) applied to the utterance source score to which the utterance source score calculation equation: $P=D^{\alpha} \cdot S^{\beta} \cdot L^{\gamma}$ is applied, the utterance source probability calculation unit 142 acquires and applies information about whether or not there is time overlap of utterance, and whether there is the other target close in position on the basis of the information input from the image event detection unit 112 and the voice event detection unit 122, and performs the process of determining the coefficients ($\alpha$, $\beta$, and $\gamma$) applied to the process of calculating the utterance source score.

Process of steps of flow shown in FIG. 15 will be described.

First, in step S301, time overlap between the voice event that is the processing target of the process of calculating the utterance source score and the just previous voice event is confirmed.

In addition, the determination whether or not there is the time overlap may be performed only by the subsequent voice event deviating in time. This is because it is difficult to completely determine whether or not there is the other voice event overlapping in time at the time point when the proceeding voice event is detected (at the time when the end time of the proceeding voice event is determined).

Then, in step S302, it is confirmed whether or not there is the other target close in position to the processing target. For example, this process may be performed using the user position information input from the target information updating unit 141.

Then, in step S303, the weight coefficients of $\alpha$: weight coefficient of sound source direction information, and $\gamma$: weight coefficient of lip movement information according to whether or not there is the time overlap determined step S301 and whether or not there is the other target close in position determined in step S302, and all the weight coefficients are adjusted.

In addition, in the adjustment of the weight coefficients, the adjustment is performed to satisfy the restriction condition of $\alpha+\beta+\gamma=1$.

Lastly, in step S304, the utterance source probability calculation unit 142 calculates the utterance source score of the target by applying D: sound source direction information, S: utterer identification information, and L: lip movement information as the input information, applying the weight coefficients determined in step S303, that is, $\alpha$: weight coefficient of sound source direction information, $\beta$: weight coefficient of utterer identification information, and $\gamma$: weight coefficient of lip movement information, where $\alpha+\beta+\gamma=1$, and applying the utterance source score calculation equation $P=D^{\alpha} \cdot S^{\beta} \cdot L^{\gamma}$.

A specific example of the process of calculating the utterance source score according to situations will be described in detail with reference to FIG. 16A to FIG. 16D and the like.

As described with reference to the flow of FIG. 15, in the process of calculating the utterance source score, it is adoptively changed what input information is important according to a situation where voice is emanated.

When there are two persons who may be speaking, as an example of the situation where the voice is emanated, for example, the following situations are assumed as shown in FIG. 16A to FIG. 16D.

(a) when positions of two persons are far and only one person is speaking (b) when positions of two persons are far and two persons are speaking simultaneously (c) when positions of two persons are close and only one person is speaking (d) when positions of two persons are close and two persons simultaneously are speaking FIG. 17 shows a situation where the voice is emanated, a relationship of a method of adjusting the coefficients ($\alpha$, $\beta$, and $\gamma$) applied to the process of calculating the utterance source score to which the utterance source score calculation equation: $P=D^{\alpha} \cdot S^{\beta} \cdot L^{\gamma}$ described above is applied, and a numerical example.

The utterance source score probability calculation equation 142 dynamically adjusts what values the weight coefficients of input information are set to, according to the situation where the voice is emanated.

The situation of adjusting the weight coefficients is completed by combination of the following two conditions.

(Condition 1) whether single utterance from only one user (one target) or simultaneous utterance from two users (two targets)

(Condition 2) whether positions of two users (two targets) are close or positions of two users (two targets) are far Concerning whether positions of two users are close or far in the (Condition 2) described above, a preset predetermined threshold value is applied on the basis of the difference of the sound source direction, that is, the angle representing the sound source direction, to determine whether close or far.

For example, a case where an absolute value of the difference of the sound source direction corresponding to the positions of two users is equal to or less than 10° is determined as "positions of two users are close".

In addition, the fact that the absolute value of the difference of the sound source direction is equal to or less than 10° corresponding to the fact that a distance between two users is within about 53 cm at a position far away from a microphone by 3 m.

As described above, "the sound source direction is close" is replaced by "the distance between the users is close" or "the position of the users are close".

Hereinafter, a specific example of a method of adjusting the weight coefficients according to the utterance situations of FIG. 16A to FIG. 16D, that is, the weight coefficients ($\alpha$, $\beta$, and $\gamma$) of $\alpha$: weight coefficient of sound source direction, $\beta$: weight coefficient of utterer identification information, and $\gamma$: weight coefficient of lip movement information, where $\alpha+\beta+\gamma=1$ will be described.

When positions of two users are far and only one user is speaking alone as shown in FIG. 16A, the adjustment of all the weight coefficients ($\alpha$, $\beta$, and $\gamma$) is not performed, and a preset value is used.

That is, in the situation where there are two targets with an utterance probability, when only one target are speaking alone, the utterance source probability calculation unit 142 does not perform the adjustment of all the weight coefficients ($\alpha$, $\beta$, and $\gamma$), and uses a preset value.

When positions of two users are far and two users simultaneously are speaking as shown in FIG. 16B, the adjustment is performed such that the weight ($\gamma$) of the lip movement information is made small.

That is, in the situation where there are two targets with an utterance probability, when two targets simultaneously are speaking, the utterance source probability calculation unit 142 performs the process of adjusting the weight coefficients: $\alpha$, $\beta$, and $\gamma$ such that the weight $\gamma$ of the lip movement information is made small.

When positions of two users are close and only one user is speaking alone as shown in FIG. 16C, the adjustment is performed such that the weight (α) of the sound source direction information is made small.

That is, in the situation where there are two targets with an utterance probability, when positions of two targets are close and only one target is speaking alone, the utterance source probability calculation unit 142 performs the process of adjusting the weight coefficients: α, β, and γ such that the weight α of the sound source direction information is made small.

When positions of two users are close and two users simultaneously are speaking as shown in FIG. 16D, the adjustment is performed such that the weight (γ) of the lip movement information and the weight (α) of the sound source direction information are made small.

That is, in the situation where there are two targets with an utterance probability, when positions of two targets are close and two targets simultaneously are speaking, the utterance source probability calculation unit 142 performs the process of adjusting the weight coefficients: α, β, and γ such that the weight γ of the lip movement information and the weight α of the sound source direction information are made small.

In any process, the adjustment is performed to satisfy the restriction of α+β+γ=1. An example of summarizing the adjustment of such weight coefficients (α, β, and γ) is shown in FIG. 17.

In the situations where the voice is emanated, concerning how much a desired weight coefficient is made large or how the weight coefficients are set, determination by previous investigation using evaluation data may be used.

FIG. 18A and FIG. 18B are diagrams illustrating the following two examples as specific adjustment examples of the weight coefficients (α, β, and γ).

(A) numerical example of all weight coefficients (all the preset values are the same (preset values: α=β=γ)

(B) numerical example of all weight coefficients (the preset values are different (preset values: α≠β≠γ)

In a case of (A), the preset values are α=β=γ=0.333.

In a case of (B), the preset values are α≠β≠γ, where α=0.500, β=0.200, and γ=0.300.

Even in any case of (A) and (B), when the desired weight coefficient is made small, the adjustment is performed such that it is ½ from the present value of the weight coefficient.

In a case of only one weight coefficient, the other two coefficients are adjusted such that a ratio thereof is the same as the preset value.

In FIG. 18A, when the weight coefficient (γ) of the lip movement information is ½ (0.333 to 0.167), the other two weight coefficients are the same numerical value (0.333 and 0.333) in the preset value. Accordingly, all of two weight coefficients are 0.417 to be the same ratio even after the adjustment.

In FIG. 18B, when the weight coefficient (γ) of the lip movement information is ½ (0.300 to 0.150), the other two weight coefficients are 0.500 and 0.200 in the preset value. Accordingly, two weight coefficients are 0.607 to and 0.243 to be the same ratio even after the adjustment.

In step S303 in the flowchart shown in FIG. 15, for example, as described above, the weight coefficients of α: weight coefficient of sound source direction information, β: weight coefficient of utterer identification information, and γ: weight coefficient of lip movement information are adjusted.

Thereafter, the adjusted weight coefficients are applied, the utterance source score calculation equation P: $P = D^{\alpha} \cdot S^{\beta} \cdot L^{\gamma}$, and the utterance source score of the target is calculated.

According to the equation described above, the utterance source score for each target is calculated, and it is possible to determine that the target with the highest score is the utterance source by comparison of the scores.

In the information processing apparatus of the present disclosure, as described above, both the utterer identification information and the lip movement information are considered, the applied weight coefficients of these information items are changed to calculate the utterance source score, and the utterance source probability is calculated according to the calculated score.

According to this process, for example, even in a situation where a plurality of utterers are speaking simultaneously, it is possible to specify the utterer with high precision using the score calculation and the score comparison.

That is, even in a variety of more real situations, it is possible to correctly estimate the utterer.

[6. Summary of Configurations of the Present Disclosure]

Examples have been described above in detail with reference to the specific examples. However, it is obvious that the examples may be modified or replaced by a person skilled in the art within a scope which does not deviate from the main concept of the present disclosure. That is, the present disclosure has been disclosed using the form of examples, and thus the present disclosure should not be analyzed in a limited way. To determine the main concept of the present disclosure, the Claims should be referred to.

The technique disclosed in the specification may have the following configurations.

(1) An information processing apparatus including:

a plurality of information input units that input observation information of a real space;

an event detection unit that generates event information including estimated position information and estimated identification information of users present in the real space based on analysis of the information input from the information input unit; and an information integration processing unit that inputs the event information, and generates target information including a position of each user and user identification information on the basis of the input event information, and signal information representing a probability value of the event generation source, wherein the information integration processing unit includes an utterance source probability calculation unit, and wherein the utterance source probability calculation unit performs a process of calculating an utterance source score as an index value representing an utterance source probability of each target by multiplying weights based on utterance situations by a plurality of different information items input from the event detection unit.

(2) The information processing apparatus according to the above (1), wherein the utterance source probability calculation unit receives an input of (a) user position information (sound source direction information), and (b) user identification information (utterer identification information) which are corresponding to an utterance event as input information from a voice event detection unit constituting the event detection unit, receives an input of (a) user position information (face position information), (b) user identification information (face identification information), and (c) lip movement information as the target information generated based on input information from an image event detection unit constituting the event detection unit, and performs a process of calculating the utterance source score based on the input information by adopting at least one item of the information.

(3) The information processing apparatus according to the above (1) or (2), wherein the utterance source probability calculation unit applies sound source direction information D, utterer identification information S, and lip movement information L, and performs a process of calculating the utterance source score according to the following formula for calculating the utterance source score P:

$$P = D^\alpha \cdot S^\beta \cdot L^\gamma,$$

where α is a weight coefficient of sound source direction information, β is a weight coefficient of utterer identification information, γ is a weight coefficient of lip movement information, and α+β+γ=1.

(4) The information processing apparatus according to the above (3), wherein the utterance source probability calculation unit performs a process of adjusting the weight coefficients α, β, and γ according to an utterance situation.

(5) The information processing apparatus according to the above (3) or (4), wherein the utterance source probability calculation unit performs a process of adjusting the weight coefficients α, β, and γ according to the following two conditions of (Condition 1) whether single utterance from only one target or simultaneous utterance from two targets and (Condition 2) whether positions of two targets are close to each other or positions of the two targets are far.

(6) The information processing apparatus according to any one of the above (3) to (5), wherein the utterance source probability calculation unit performs a process of adjusting the weight coefficients α, β, and γ such that the weight coefficient γ of the lip movement information is small in a situation where two targets with an utterance probability are present and the two targets speak simultaneously.

(7) The information processing apparatus according to any one of the above (3) to (5), wherein the utterance source probability calculation unit performs a process of adjusting the weight coefficients α, β, and γ such that the weight coefficient α of the sound source direction information is small in a situation where two targets with an utterance probability are present and positions of the two targets are close to each other and only one target speaks.

(8) The information processing apparatus according to any one of the above (3) to (5), wherein the utterance source probability calculation unit performs a process of adjusting the weight coefficients α, β, and γ such that the weight coefficient γ of the lip movement information and the weight coefficient α of the sound source direction information are small in a situation where two targets with an utterance probability are present and positions of the two targets are close to each other and two targets speak simultaneously.

The configuration of the present disclosure includes a method of a process performed in the apparatus described above, or a program for executing a process.

A series of processes described throughout the specification can be performed by hardware or software or by a complex configuration of both. In a case of the processes being performed by software, a program in which the processing sequence is recorded is installed in the memory within a computer built into dedicated hardware to perform the process, or is installed in a general-purpose computer in which various processes can be performed to thereby perform the process. For example, the program may be recorded in a recording medium in advance. In addition to being installing to a computer from the recording medium, the program can be received via a network such as a LAN (Local Area Network) or the Internet, installed in a recording medium such as a built-in hard disk, or the like.

In addition, various processes described in the specification may be performed in time series as described, and may be performed in parallel or individually in response to a processing capacity or a requirement of a device performing the process. In addition, the system throughout the specification is a logical set configuration of multiple devices, and it is not necessary that a device of each configuration is in the same housing.

The present disclosure contains subject matter related to that disclosed in Japanese Priority Patent Application JP 2011-247130 filed in the Japan Patent Office on Nov. 11, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a plurality of information input units that input observation information of a real space;
an event detection unit that generates event information including estimated position information and estimated identification information of users present in the real space based on analysis of the information input from the information input unit; and
an information integration processing unit that inputs the event information, and generates target information including a position of each user and user identification information on the basis of the input event information, and signal information representing a probability value of the event generation source,
wherein the information integration processing unit includes an utterance source probability calculation unit, and
wherein the utterance source probability calculation unit performs a process of calculating an utterance source score as an index value representing an utterance source probability of each target by multiplying weights by a plurality of different information items input from the event detection unit, wherein the weights are adjusted based on whether a single utterance occurs from only one target or simultaneous utterance occurs from two targets.

2. The information processing apparatus according to claim 1, wherein the utterance source probability calculation unit receives inputs of (a) user position information with respect to a sound source direction, and (b) user identification information based on utterer identification which are corresponding to an utterance event as input information from a voice event detection unit constituting the event detection unit, inputs (a) user position information with respect to a face position of a user, (b) user identification information based on face identification, and (c) lip movement information as the target information generated based on input information from an image event detection unit constituting the event detection unit, and performs a process of calculating the utterance source score based on the input information by adopting at least one item of the information.

3. An information processing apparatus comprising:
a plurality of information input units that input observation information of a real space;
an event detection unit that generates event information including estimated position information and estimated identification information of users present in the real space based on analysis of the information input from the information input unit; and
an information integration processing unit that inputs the event information, and generates target information including a position of each user and user identification information on the basis of the input event information, and signal information representing a probability value of the event generation source, wherein the information integration processing unit includes an utterance source probability calculation unit, wherein the utterance source probability calculation unit performs a process of calculating an utterance source score as an index value representing an utterance source probability of each target by multiplying weights based on utterance situations by a plurality of different information items input from the event detection unit, and wherein the utterance source probability calculation unit applies sound source direction information D, utterer identification information S, and lip movement information L, and performs a process of calculating the utterance source score according to the following formula for calculating the utterance source score P:

$P = D^\alpha \cdot S^\beta \cdot L^\gamma$ where α is a weight coefficient of sound source direction information, β is a weight coefficient of utterer identification information, γ is a weight coefficient of lip movement information, and $\alpha+\beta+\gamma=1$.

4. The information processing apparatus according to claim 3, wherein the utterance source probability calculation unit performs a process of adjusting the weight coefficients α, β, and γ according to an utterance situation.

5. The information processing apparatus according to claim 3, wherein the utterance source probability calculation unit performs a process of adjusting the weight coefficients α, β, and γ according to the following two conditions of (Condition 1) whether single utterance from only one target or simultaneous utterance from two targets and (Condition 2) whether positions of two targets are close to each other or positions of the two targets are far.

6. The information processing apparatus according to claim 3, wherein the utterance source probability calculation unit performs a process of adjusting the weight coefficients α, β, and γ such that the weight coefficient γ of the lip movement information is small in a situation where two targets with an utterance probability are present and the two targets speak simultaneously.

7. The information processing apparatus according to claim 3, wherein the utterance source probability calculation unit performs a process of adjusting the weight coefficients α, β, and γ such that the weight coefficient α of the sound source direction information is small in a situation where two targets with an utterance probability are present and positions of two targets are close to each other and only one target speaks.

8. The information processing apparatus according to claim 3, wherein the utterance source probability calculation unit performs a process of adjusting the weight coefficients α, β, and γ such that the weight coefficient γ of the lip movement information and the weight coefficient α of the sound source direction information are small in a situation where two targets with an utterance probability are present and positions of the two targets are close to each other and the two targets speak simultaneously.

9. An information processing method of performing an information analysis process in an information processing apparatus, the method comprising:

receiving, by a plurality of information input units, an input of observation information of a real space;

generating, by an event detection unit, event information including estimated position information and estimated identification information of users present in the real space based on analysis of the information input from the information input unit; and receiving, by an information integration processing unit, an input of the event, and generating target information including a position of each user and user identification information on the basis of the input event information, and signal information representing a probability value of the event generation source, wherein in the generating of the target information, a process of calculating an utterance source score as an index value representing an utterance source probability of each target by multiplying weights by a plurality of different information items input in the generating of the event information is performed, wherein the weights are adjusted based on whether positions of two targets are close to each other or positions of the two targets are far.

10. A non-transitory computer-readable medium, having stored thereon, a computer program having at least one code section executable by a computer, thereby causing the computer to perform the steps comprising:

receiving, by a plurality of information input units, an input of observation information of a real space;

generating, by an event detection unit, event information including estimated position information and estimated identification information of users present in the real space based on analysis of the information input from the information input unit; and receiving, by an information integration processing unit, an input of the event, and generating target information including a position of each user and user identification information on the basis of the input event information, and signal information representing a probability value of the event generation source, wherein in the generating of the target information, a process of calculating an utterance source score as an index value representing an utterance source probability of each target by multiplying weights by a plurality of different information items input in the generating of the event information is performed, wherein the weights are adjusted based on whether positions of two targets are close to each other or positions of the two targets are far.

* * * * *